US008095802B2

(12) United States Patent
Nutter et al.

(10) Patent No.: US 8,095,802 B2
(45) Date of Patent: Jan. 10, 2012

(54) SYSTEM AND METHOD FOR SECURELY SAVING A PROGRAM CONTEXT TO A SHARED MEMORY

(75) Inventors: Mark Richard Nutter, Austin, TX (US); Kanna Shimizu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1264 days.

(21) Appl. No.: 11/530,937

(22) Filed: Sep. 12, 2006

(65) Prior Publication Data

US 2008/0066074 A1    Mar. 13, 2008

(51) Int. Cl.
G06F 12/14    (2006.01)
(52) U.S. Cl. ........................................................ 713/193
(58) Field of Classification Search .................. None
See application file for complete search history.

(56) References Cited

U.S. PATENT DOCUMENTS

| 5,982,891 | A | 11/1999 | Ginter et al. ...................... 705/54 |
| 6,651,169 | B1 * | 11/2003 | Benson et al. ................. 713/193 |
| 6,732,275 | B1 | 5/2004 | Dimenstein ................... 713/193 |
| 6,988,205 | B2 | 1/2006 | Walker et al. ................. 713/193 |
| 7,519,836 | B2 | 4/2009 | Walker et al. ................. 713/194 |
| 2005/0265554 | A1 | 12/2005 | Walker et al. ................. 380/283 |
| 2006/0015748 | A1 * | 1/2006 | Goto et al. ..................... 713/190 |
| 2006/0015876 | A1 * | 1/2006 | Day et al. ....................... 718/108 |
| 2008/0065547 | A1 | 3/2008 | Shimizu ........................... 705/51 |

FOREIGN PATENT DOCUMENTS

| EP | 1 126 356 A | 8/2001 |
| JP | 2002229447 A | 8/2002 |

OTHER PUBLICATIONS

Sony Corporation, "Cell Broadband Engine Architecture, Version 1.0", Aug. 8, 2005.*
Shimuzu, "The Cell Broadband Engine Processor Security Architecture," Apr. 24, 2006, published by IBM Developerworks, http://www.-128.ibm.com/developerworks/power/library/pa-cellsecurity/>.

(Continued)

*Primary Examiner* — Nasser Moazzami
*Assistant Examiner* — Michael S McNally
(74) *Attorney, Agent, or Firm* — VanLeeuwen & VanLeeuwen; Matthew B. Talpis

(57) ABSTRACT

A system, method and program product for securely saving a program context to a shared memory is presented. A secured program running on an special purpose processor core running in isolation mode is interrupted. The isolated special purpose processor core is included in a heterogeneous processing environment, that includes purpose processors and general purpose processor cores that each access a shared memory. In isolation mode, the special purpose processor core's local memory is inaccessible from the other heterogeneous processors. The secured program's context is securely saved to the shared memory using a random persistent security data. The lines of code stored in the isolated special purpose processor core's local memory are read along with data values, such as register settings, set by the secured program. The lines of code and data values are encrypted using the persistent security data, and the encrypted code lines and data values are stored in the shared memory.

20 Claims, 15 Drawing Sheets

OTHER PUBLICATIONS

Srinivasan et al., "Cell Broadband Engine processor DMA engines, Part 2: From an SPE point of view," May 2, 2006, published by IBM Developerworks, http://www.ibm.com/developerworks/power/library/pa-celldmas2/index.html.

U.S. Appl. No. 11/530,940, System and Method for Digital Content Player with Secure Processing Vault.

U.S. Appl. No. 11/530,933, System and Method for Securely Restoring a Program Context from a Shared Memory.

U.S. Appl. No. 11/530,942, System and Method for Securely Saving and Restoring a Context of a Secure Program Loader.

U.S. Appl. No. 11/345,848, filed Feb. 2, 2006, H. Peter Hofstee.

Office action for pending U.S. Appl. No. 11/530,940, 9 pages, mailed Oct. 30, 2008.

Final Office Action for U.S. Appl. No. 11/530,933, mailed Jul. 13, 2010, 17 pages.

Final Office Action for U.S. Appl. No. 11/530,942, mailed Jul. 30, 2010, 16 pages.

* cited by examiner

SYSTEM AND METHOD FOR SECURELY SAVING A PROGRAM CONTEXT TO A SHARED MEMORY

BACKGROUND OF THE INVENTION

1. Technical Field

The present invention relates in general to a system and method for securely saving a program context. More particularly, the present invention relates to a system and method that saves a program's context from an isolated special processing unit to a shared memory in a heterogeneous processing system.

2. Description of the Related Art

Computing systems comprising a multiplicity of heterogeneous processors are becoming increasingly popular. In these environments, one or more general purpose processor cores work in conjunction with one or more special purpose processor cores. Typically, since they have different characteristics, the general purpose processor cores use a different instruction set architecture (ISA) than those used by the special purpose or application specific processors. Having different processing characteristics and ISAs lends each processor type to efficiently performing different types of tasks.

Because of the different characteristics of the processors, heterogeneous processors are attractive to a variety of environments, such as multimedia, gaming, and numeric intensive application environments. In this environment, a program can have multiple threads. Some of these threads can execute on the general purpose processor cores and other threads can execute on the special purpose processor cores. While multiple special purpose processor cores may be included in a single system, these special purpose processor cores may still become constrained prompting the system to task switch a thread currently running on one of the special purpose processor cores in order to load and execute a different thread on the special purpose processor core.

One threat posed to existing computer systems are malevolent users, such as hackers, that strive to circumvent security measures used by applications in order to make illegitimate copies of the software (often for profit), or hack the software so that a different image of the software is loaded and executed by the system. Swapping one version of software for another is often referred to as a "replay attack." One technique used by malevolent users is to capture the image of a software program that has been tasked out by the operating system and reuse the image.

What is needed, therefore, is a system and method that uses a secure loader to securely save a software program. Furthermore, what is needed is a system and method that securely saves and a program in a manner that effectively prevents replay attacks.

SUMMARY

It has been discovered that the aforementioned challenges are resolved using a system, method, and program product that securely saves a program's context to a shared memory. An interrupt is sent to a secured program running on a special purpose processor core that is running in isolation mode. The isolated special purpose processor core is included in a heterogeneous processing environment, that includes general purpose processor cores and special purpose processor cores (including the isolated special purpose processor). Each of the heterogeneous processors (heterogeneous processor cores) can access a shared memory. When the special purpose processor core is running in isolation mode, its a local memory is inaccessible from the other heterogeneous processors. The secured program's context is securely saved to the shared memory using a random persistent security data. The lines of code stored in the isolated special purpose processor core's local memory are read along with data values, such as register settings, set by the secured program. The lines of code and data values are encrypted using the persistent security data, and the encrypted code lines and data values are stored in the shared memory.

In one embodiment, the persistent security data is saved in a persistent storage register. In this embodiment, the persistent security data is a nonce and one of the data values that is encrypted is the nonce. In this embodiment, the encrypting is performed using a static encryption key. The persistent storage register being accessible when the special purpose processor core is running in isolation mode.

In another embodiment, the persistent security data is a randomly generated encryption key that is used in encrypting the lines of code and data values. In this embodiment, the persistent security data is saved in a persistent storage register, and the persistent storage register is accessible when the special purpose processor core is running in isolation mode.

In one embodiment, the isolated special processing unit includes an unprotected open memory space that is used for transferring data between the isolated special purpose processor core and the shared memory. In this embodiment, the values stored in the unprotected open space memory are read and written to the shared memory without being encrypted.

In another embodiment, a program counter is retrieved that corresponds to a location within the secured program where the secured program was interrupted. The program counter is encrypted and stored in the shared memory.

In one embodiment, after the secured program's context has been stored in the shared memory, the isolated special purpose processor core's local memory is cleared, however, the persistent storage register is left intact. The special purpose processor core is then returned to a non-isolation mode. A second program in then loaded in the special processing unit running now running in a non-isolation mode. However, the persistent storage register is only accessible when the special purpose processor core is running in isolation mode and is therefore inaccessible to the second program.

In another embodiment, the secured program's encrypted context (data) is inputted to a signature generation accumulation function that generates a signature accumulator result. The signature accumulator result is encrypted and saved to the shared memory along with the secured program's context.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
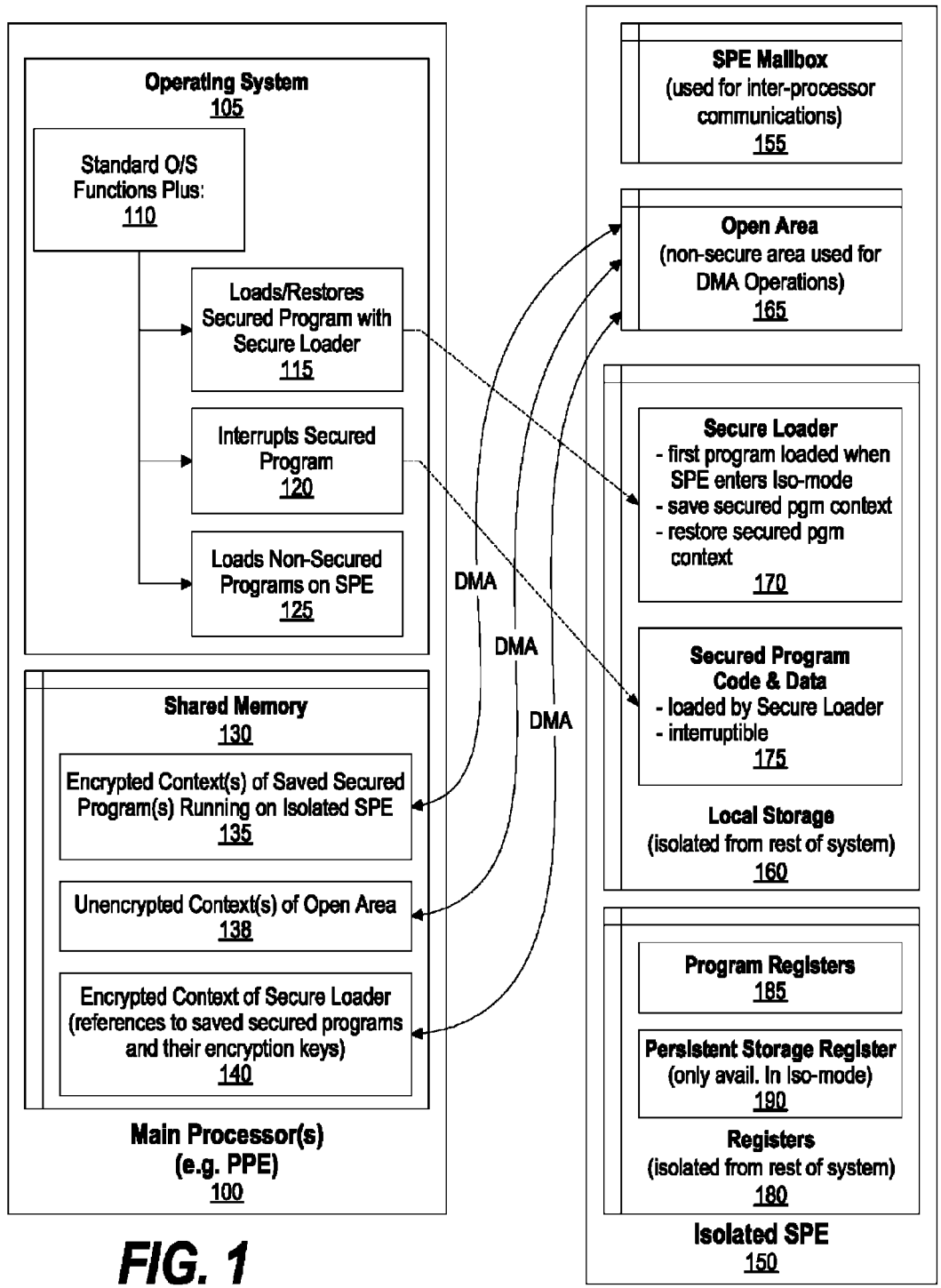
FIG. 1 is block diagram showing the interaction between various components to securely save and restore program context.
Figure 15:
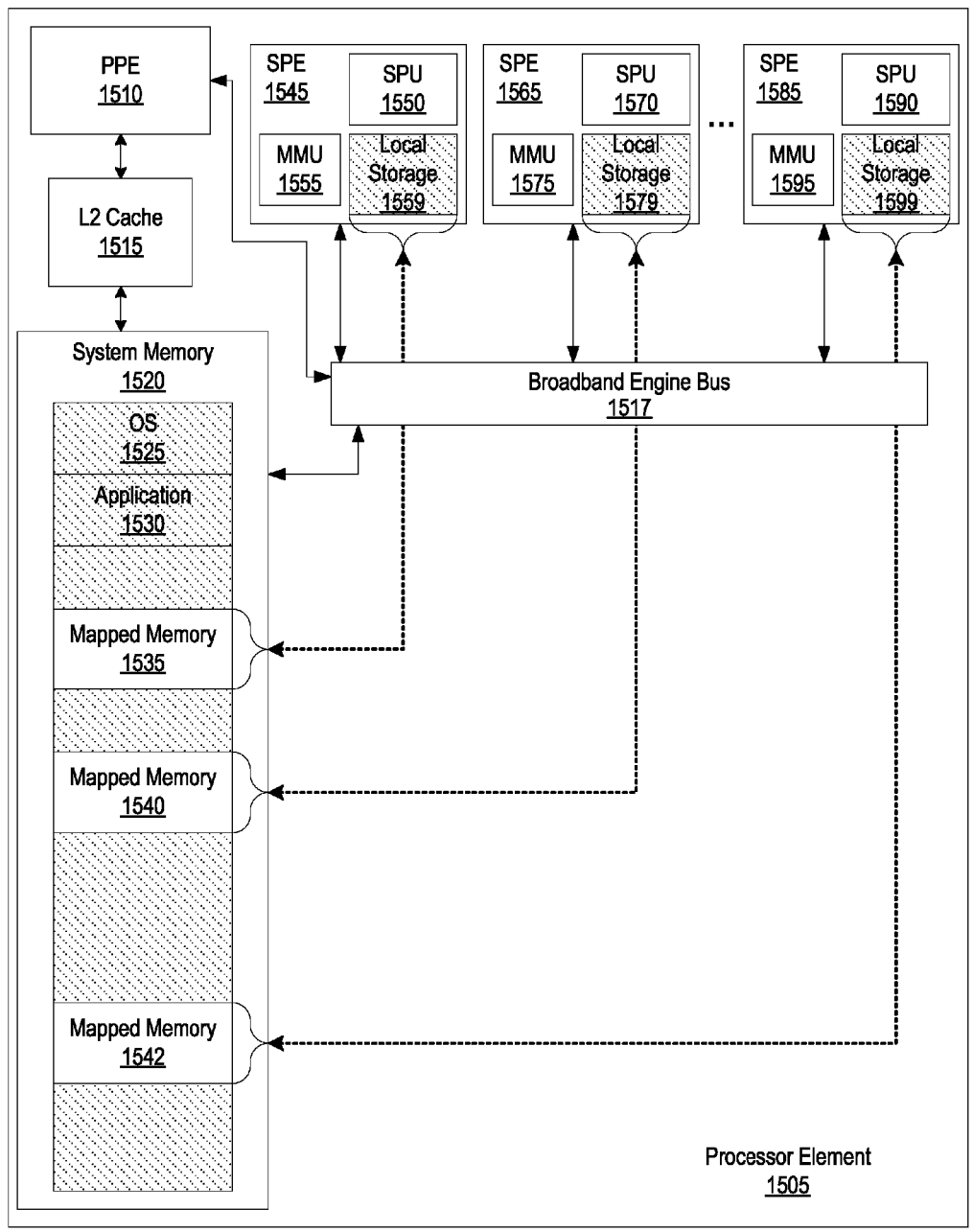
FIG. 15 is a block diagram of a broadband engine that includes a plurality of heterogeneous processors in which the present invention can be implemented.

FIG. 1 is block diagram showing the interaction between various components to securely save and restore program context. General purpose processor core(s) 100 execute operating system 105 and are interconnected to a system memory, referred to as shared memory 130. One example of a general purpose processor core is a Primary Processing Element (PPE) which is more fully described in FIG. 15. One example of a special purpose processor core is a Synergistic Processing Element (SPE) which is also more fully described in FIG. 15. As seen in FIG. 15, one feature of the system is a shared memory (130) that can be accessed by both the general purpose processor cores as well as the special purpose processor cores. In one embodiment, the general purpose processor cores use traditional read and store commands to read and store data stored in shared memory 130, while the SPEs use Direct Memory Access (DMA) commands to access the shared memory through a DMA controller.

Returning to FIG. 1, operating system 105 performs traditional, standard, operating system functions (110) as well as additional functions that are generally not performed by a traditional operating system. These non-standard functions include securely loading and restoring a secured program that is running on one of the special purpose processor cores (115), interrupting a secured program currently running on an SPE running in isolation mode (120), and loading non-secured programs on the SPE that do not use the secure loader and execute while the SPE is in a non-isolation mode.

Shared memory 130 is used to store various types of data. One type of data that is stored in shared memory 130 is context data that corresponds to a secured program that was running on an isolated SPE (150), but was interrupted. Context data includes encrypted contexts of saved secured programs that were being executed by one of the SPEs before being interrupted and tasked out (135). Context data further includes unencrypted contexts of the open area (165) as it existed when the secured program was being executed (138). Open area 165 is an unprotected memory area that is used for DMA operations between the SPE and the shared memory. In one embodiment, the context of open area 165 is not encrypted because the open area is an unprotected memory area. In one embodiment, the secure loader (170) is a static loader that saves and restores a single program from an isolated SPE. In an alternative embodiment, the secure loader is a static loader that manages the contexts (code and data) for multiple programs running on an isolated SPE. In this alternative embodiment, the context for the loader is also encrypted and stored in shared memory 130. In the alternative embodiment, the secure loader's context is encrypted and includes data related to the secured programs that it is managing (140). This data includes identifier information (addresses where the secured program's context is stored in shared memory), encryption keys corresponding to the programs being managed, and program counter information related to the position in the secured program where execution was interrupted by the operating system.

When SPE 150 is operating in isolation mode, its local storage 160 is not accessible to other processes, such as those being run on the PPE. The SPE's secured local storage 160 is used to store and execute secure loader 170 and the secured program's code and data 175. In one embodiment, the secure loader is a static program stored in a read-only memory. When an SPE enters isolation mode, the static secure loader is the first program loaded. The secure loader is then responsible for loading secured program 170 into the SPE's local storage 160 where it is executed by the SPE. In one embodiment, the operating system writes identifier data, such as a pointer, corresponding to the program that should be loaded to SPE mailbox 155 and, once the secure loader is loaded, it reads the identifier data from the SPE mailbox.

When the secured program receives an interrupt from the operating system, it branches to secure loader 170 and the secure loader is responsible for securely saving the secured programs context (code and data). The secure loader securely saves the secured program's code and data by encrypting the code/data, writing the encrypted data to open area 165, and using DMA commands to write the encrypted data to shared memory 130 (specifically, by writing the data to data area 135 in shared memory 130). The secure loader also saves the state of open area 165 that the secured program was using for DMA operations. Because open area 165 is not a protected area of memory, the secure loader saves the state of the open area without encrypting the data. The secure loader also saves the values in the various SPE registers 180. SPE registers include non-persistent registers 185 as well as persistent storage register 190. The persistent storage register is used by the secure loader to store security data, such as a nonce or an encryption key. The persistent storage register is only accessible by a program running on the SPE in isolation mode. As the system automatically loads the secure loader first when the SPE enters isolation mode, the secure loader is the first process to retrieve the security data.

If the secure loader is managing multiple secured programs, the secure loader updates its own context, such as the encryption key used to encrypt the secured program's context, the program counter where the secured program was interrupted, and identifier data relating to the secured program. The identifier data includes the secured program's identifier as well as the address(es) where the secured program's context data is stored in shared memory 130.

Figure 2:
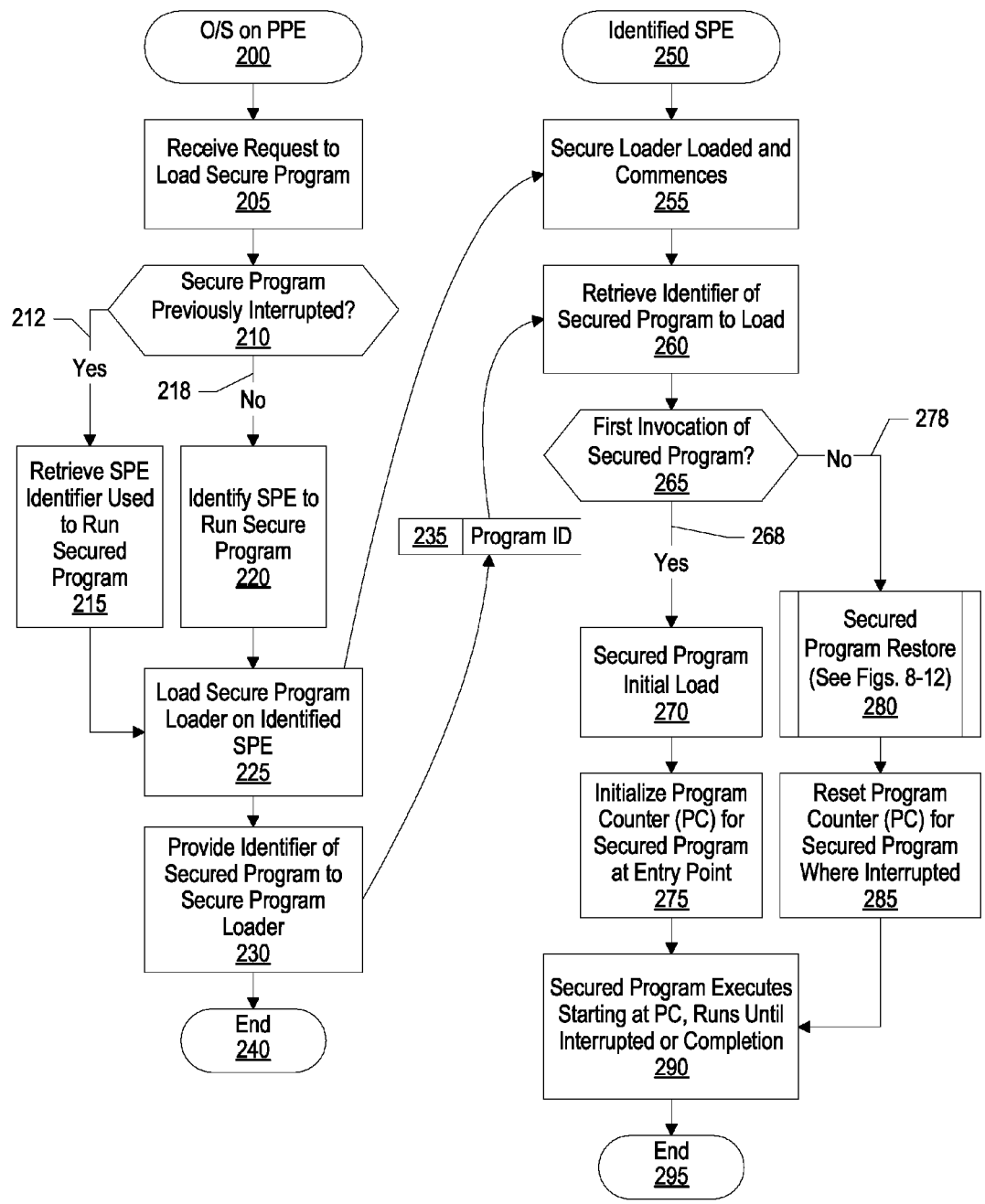
FIG. 2 is a flowchart showing the operating system requesting that a special purpose processor core load and execute a program.

FIG. 2 is a flowchart showing the operating system requesting that a special purpose processor core load and execute a program. Operating system 200 is executing on one of the general purpose processor cores (e.g., a PPE), when at step 205, it receives a request to load a secured program on a special purpose processor core (e.g., one of the SPEs). The operating system makes a determination as to whether the requested secured program was previously interrupted on one of the SPEs (decision 210) and has been tasked out. If the requested secured program was previously interrupted, decision 210 branches to "yes" branch 212 whereupon, at step 215, the operating system retrieves the identifier of the special purpose processor core (SPE) where the secured program has been running. In one embodiment, a secured program is restored onto the same SPE where it was running when it was tasked out as the loader running on that SPE has access to security data needed to restore the secured program. On the other hand, if the secured program was not previously interrupted, then decision 210 branches to "no" branch 218 whereupon, at step 220, the operating system identifies a special purpose processor core (SPE) to run the secured program, such as an SPE that is currently available.

After the SPE that will be used to run the secured program is identified, the operating system loads the secure loader on the identified SPE (step 225). In one embodiment, the operating system sets register data setting the identified SPE into isolation mode. In this embodiment, when an SPE is set to isolation mode, the secure loader is automatically loaded from a read-only memory and executes on the identified SPE. At step 230, the operating system provides the identifier of the secured program that the secure loader is to load on the isolated SPE. In one embodiment, the identifier is written to a mailbox corresponding to the identified SPE. In this embodiment, when the secure loader commences it will poll the mailbox for the identifier. At 240, the operating system functions to process the request to load the secured program ends.

Turning to processing that occurs on the identified SPE, processing commences at 250 whereupon, at step 255, the secure loader is loaded from read-only memory and commences. At step 260, the secure loader retrieves the identifier of the program to load. As previously described, in one embodiment the identifier is retrieved from a mailbox with the secure loader polling the mailbox until the secured program identifier is received. A determination is made as to whether this is the first invocation of the secured program (decision 265). If the secured program is not being restored and, instead, is being loaded on the SPE for the first time, then decision 265 branches to "yes" branch 268 whereupon, at step 270, the loader performs an initial load of the secured program, and at step 275, the loader sets the program counter to the entry point of the secured program. On the other hand, if the secured program was previously running on the SPE, was interrupted, and is now being restored, then decision 265 branches to "no" branch 278 whereupon the secured program is restored (predefined process 280, see FIGS. 8 through 12 and corresponding text for restoration processing details), and at step 285, the secure loader sets the program counter to the instruction where the secured program was interrupted by the operating system.

At step 290, the secured program (either initially loaded or restored) executes from the program counter set by the secure loader until it is either interrupted or completes. If the secured program is interrupted, then the secure loader securely saves the context of the secured program before exiting at 295.

Figure 3:
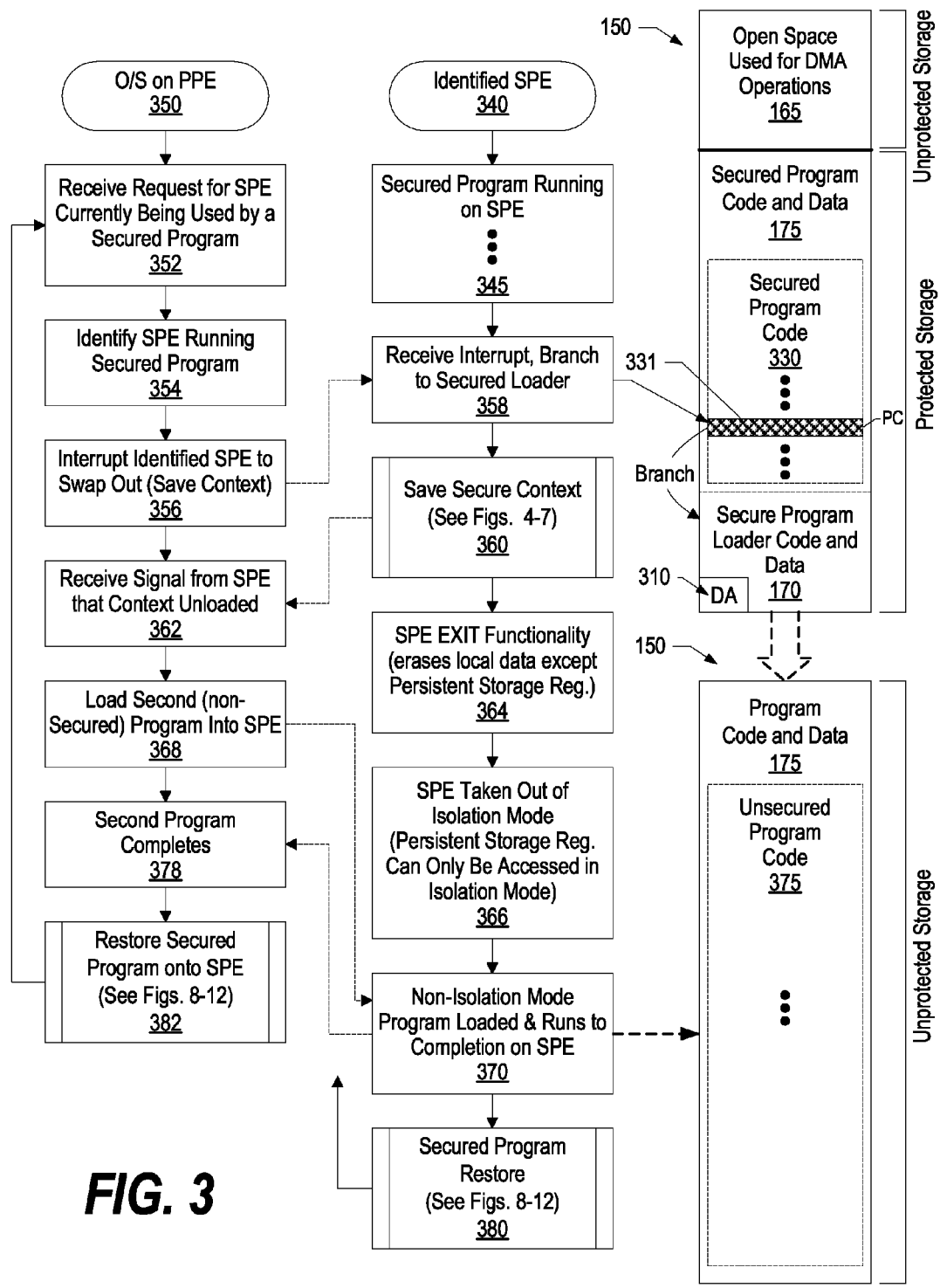
FIG. 3 is a flowchart showing the operating system interrupting a secure program running on a special purpose processor core.

FIG. 3 is a flowchart showing the operating system interrupting a secure program running on a special purpose processor core. Synergistic processing element (SPE) 150 is a special purpose processor core and was introduced in FIG. 1. In FIG. 3, SPE 150 is running secured program code 330 in protected storage. The secured program is loaded, saved, and restored by secure program loader 170 which also runs in protected storage of the SPE. The secure loader includes data area (DA) 310 which is also in protected storage and is used for saving and restoring operations as will be more fully described herein.

Processing steps for the SPE are shown starting at 340. Likewise, steps taken by the operating system that is running on the general purpose processor core (e.g., the Primary Processing Element or "PPE") are shown starting at 350. At step 345 of the SPE processing, the secured program (330) is already running on the SPE. Meanwhile, at step 352 of the operating system processing, the operating system receives a request to use the SPE that is currently being used to run secured program code 330. At step 354, the operating system identifies that the requested SPE is currently running the secured program. At step 356, the operating system sends an interrupt to the identified SPE requesting that the SPE save the context of the secured program and release control of the SPE so that another process can be executed by the SPE.

Returning to SPE processing, at step 358, the SPE receives the secured program is interrupted at location (memory address) 331. The interrupt causes the secured program to branch to the secure loader. The secure loader then saves the secured program's context (predefined process 360, see FIGS. 4 through 7 and corresponding text for processing details). The secure loader stores security data in the persistent storage register. As previously described, the persistent storage register is available to programs running in isolation mode. Because the secure loader is automatically loaded when the SPE enters isolation mode, the secure loader is able to effectively control access to the register and the data stored therein. At step 364, after the secure loader has saved the secured program's context, the secure loader issues a special SPE EXIT command that erases all of the SPE's local data (memory and registers), except for the persistent storage register. At step 366, the SPE is taken out of isolation mode.

In one embodiment, the secure loader running on an SPE manages the saving and restoring of one secured program. Returning to operating system processing, in this embodiment, at step 362, the operating system receives a signal from the SPE when the secure loader has saved the secured program's context and the SPE is available. In this embodiment, at step 368, the operating system loads a second program that does not operate in isolation mode. Returning to SPE processing, at step 370, the non-isolation mode program (unsecured program 375) is loaded in the SPE and runs to completion (i.e., is not tasked out). Returning to operating system processing, at step 378, the operating system receives a signal that the non-isolation mode program has completed, at which point the operating system has the secured program's context restored so the secured program can continue execution (predefined process 382, see FIGS. 8-12 and corresponding text for processing details). The secured program can then run until either the operating system needs to interrupt the secured program or the secured program completes. Returning to SPE processing, at predefined process 380, the secure loader restores the secured program's context (see FIGS. 8-12 and corresponding text for processing details). In another embodiment, described in FIG. 5, the secure loader can manage the contexts of more than one secured program running on the SPE by saving the secure loader's context along with the secured programs' contexts.

Figure 4:
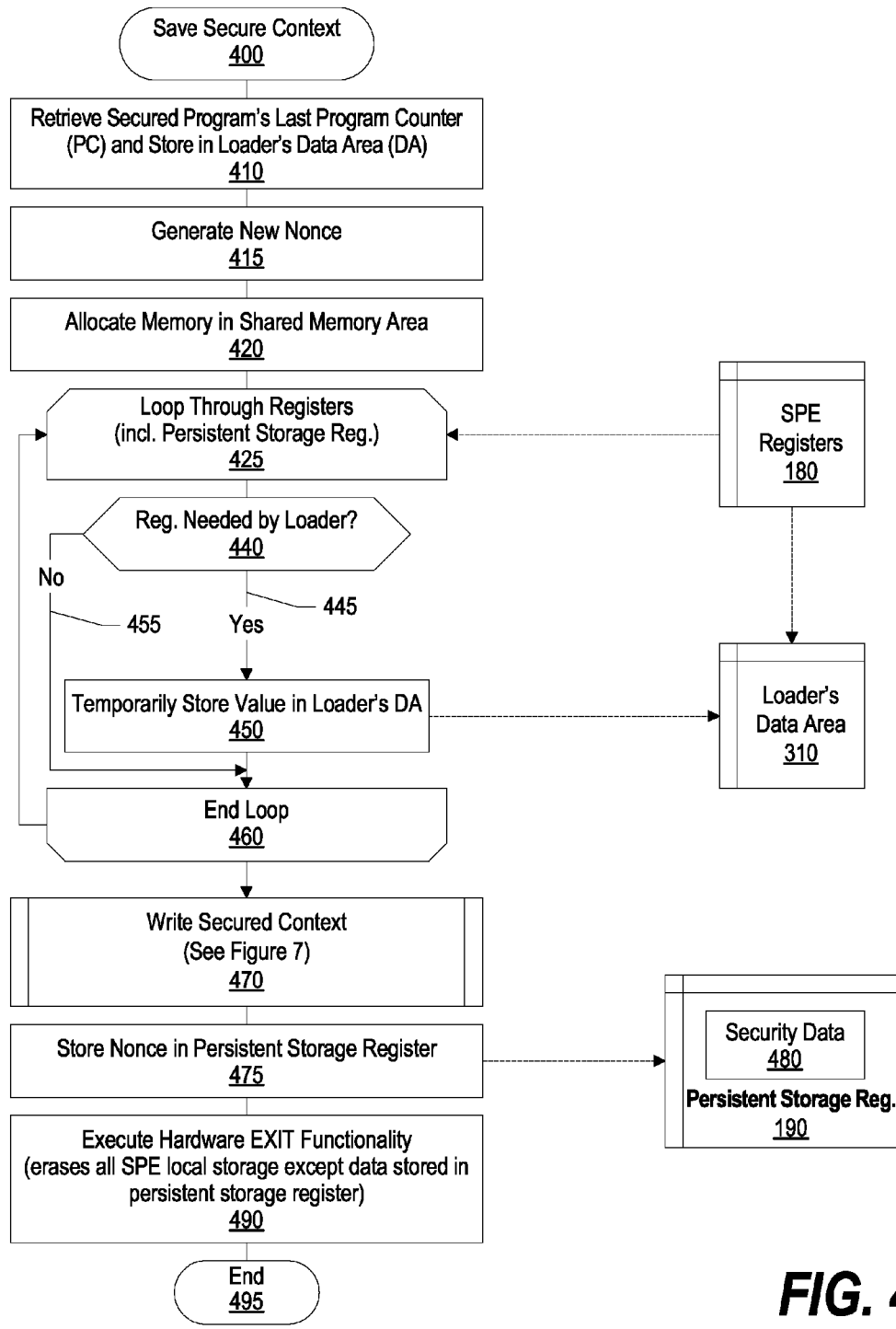
FIG. 4 is a flowchart showing the steps taken to securely save a program's context.

FIG. 4 is a flowchart showing the steps taken to securely save a secured program's context. In addition to steps shown in FIG. 4 for saving the secured program's context, a signature is generated and saved along with the program's context (see FIG. 13 and corresponding text for processing details). Processing commences at 400 whereupon, at step 410, the secure loader retrieves the memory address where the secured program was interrupted. In one embodiment, the system stores the last program counter in a register than is retrieved by the secure loader. In one embodiment, the persistent storage register is smaller than 128 bits and, therefore, cannot store a 128 bit encryption key. In this embodiment, a static key is used to encrypt the secured program's contents and a unique nonce is included in the secured program's context. In this embodiment, the nonce is generated at step 415. In an alternate embodiment, the persistent storage register is at least 128 bits wide and can accommodate a 128 bit encryption key. In the alternate embodiment, an encryption key of at least 128 bits is generated at step 415. "Persistent security data" refers to either the generated nonce or the generated encryption key that is stored in the persistent storage register. At step 420, memory is allocated in the shared memory where the (encrypted) secured program's context will be stored.

A loop commences at 425 to loop through the various SPE registers (180). A determination is made as to whether each register is needed by the secure loader (decision 440). If a register is needed by the secure loader, decision 440 branches to "yes" branch 445 whereupon, at step 450, the register contents are stored in the secure loader's data area 310. If the register is not needed by the secure loader, then decision 425 branches to "no" branch 455 bypassing step 450. The loop ends at 460.

Figure 7:
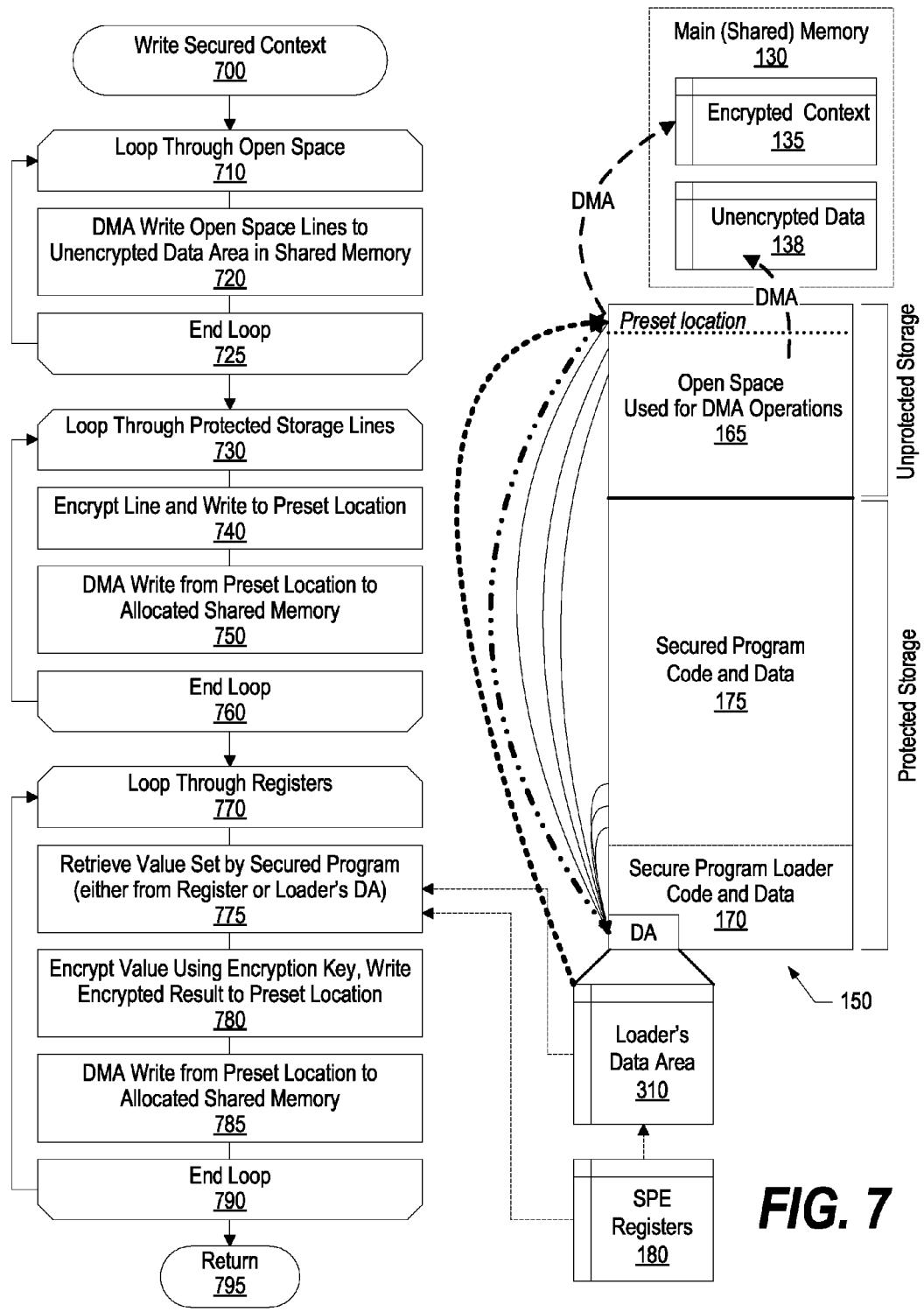
FIG. 7 is a flowchart showing the steps taken to securely write context from an isolated specialized purpose processor to a shared memory.

After registers needed by the secure loader have been freed, the secure loader encrypts and writes the secured program's context to the shared memory area (predefined process 470, see FIG. 7 and corresponding text for processing details). At step 475, the persistent security data (either the nonce or the generated encryption key) is written to the persistent storage register (security data 480 stored in persistent storage register 190). At step 490, the secure loader issues a special hardware EXIT instruction which erases all SPE local storage except the data that is stored in the persistent storage register. Processing thereafter ends at 495.

Figure 5:
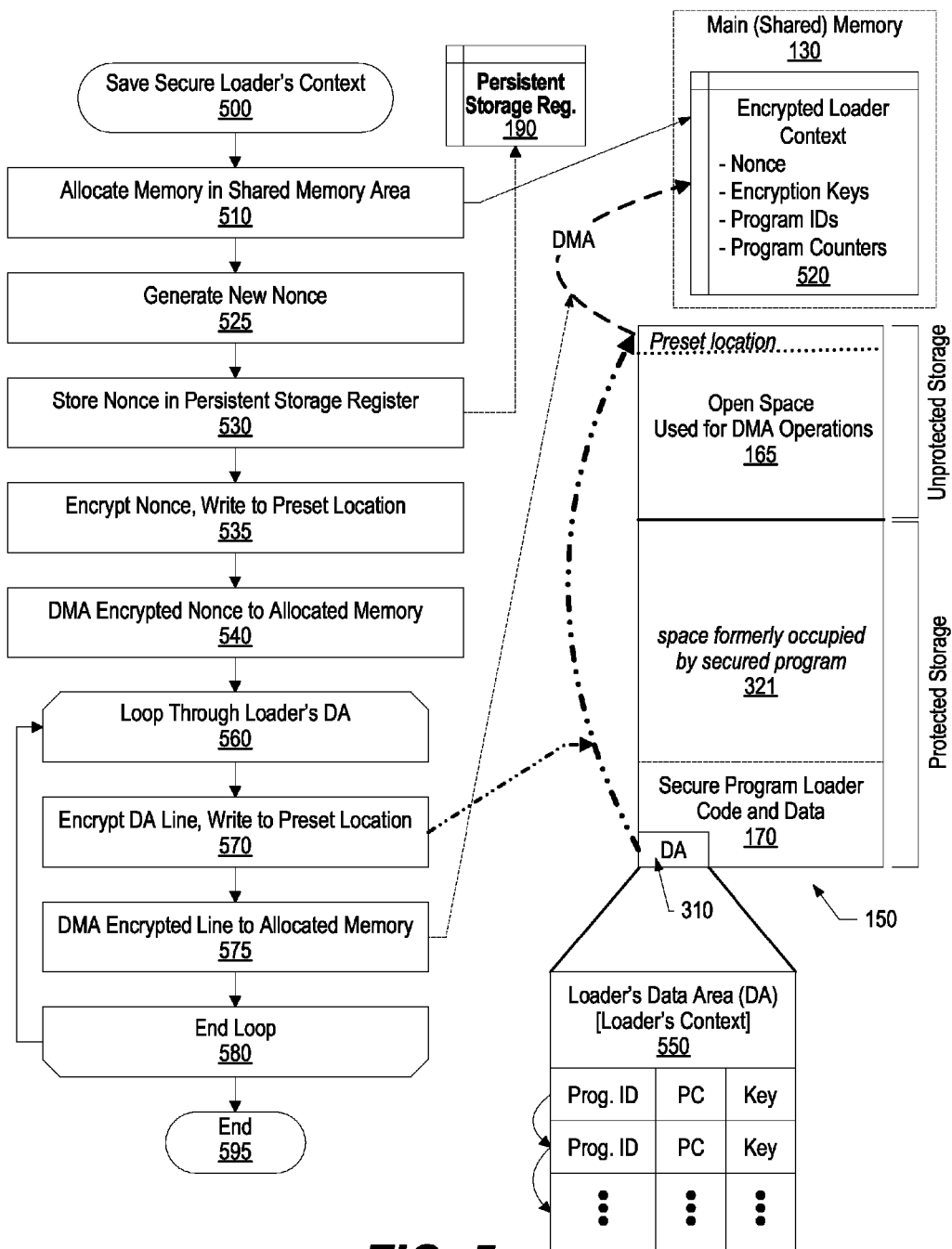
FIG. 5 is a flowchart showing the steps taken to securely save the secure loader's context.

FIG. 5 is a flowchart showing the steps taken to securely save the secure loader's context. As previously mentioned, in one embodiment the secure loader manages the contexts of multiple secured programs. In this embodiment, after the secured program's context has been saved, the secure loader's context is saved. In addition to steps shown in FIG. 5 for saving the secured loader's context, a signature is generated and saved along with the loader's context (see FIG. 13 and corresponding text for processing details). Processing commences at 500 whereupon, at step 510, the secure loader allocates a shared memory area where the (encrypted) secure loader's context will be saved. Also as previously mentioned, in one embodiment, the persistent storage register is less than 128 bits wide and therefore cannot store a 128 bit encryption key. In this embodiment, at step 525, a nonce is generated that will be stored with the encrypted secure loader's context and also stored in the persistent storage register. In an alternate embodiment where the persistent storage register is at least 128 bits wide, at step 525 an encryption key is generated. As previously mentioned, the term "persistent security data" refers to either the nonce or encryption key that is generated and stored in the persistent storage register. At step 530, the persistent security data (either the nonce or the encryption key) is stored in the persistent storage register. If a nonce is being used, at step 535 the nonce is encrypted using a static encryption key (encoded in the secure loader) and written to a preset location of open space 165, and at step 540, the encrypted nonce is written to the allocated memory area using a direct memory access (DMA) command.

A loop is started at 560 to loop through the secure loader's data area. The secure loader's data area (310) includes loader's context 550. The secure loader's context includes program identifiers, a program counter and an encryption key corresponding to each secured program being managed by the secured program. The program identifiers include both a unique identifier, such as a handle or program name, for the secured program as well as an address where the encrypted context of the secured program is stored in shared memory. The program counter (PC) is the memory address location in the secured program where the secured program was interrupted. The encryption key (Key) is a unique encryption key that was used to encrypt the context of the secured program. Within the loop, for each secured program being managed by the secure loader (e.g., each line of loader context 550), the line is encrypted at step 570 and written to the preset location in open space 165. At step 575, the encrypted line is written using a DMA command to encrypted loader context 520 stored in shared memory 130. Encrypted loader context includes an encrypted nonce (if one is being used), along with program identifiers (handles and addresses), program counters, and encryption keys corresponding to each of the programs being managed by the secure loader. At 580, the loop ends. When the secure loader's context has been encrypted and written to shared memory, processing ends at 595.

Figure 6:
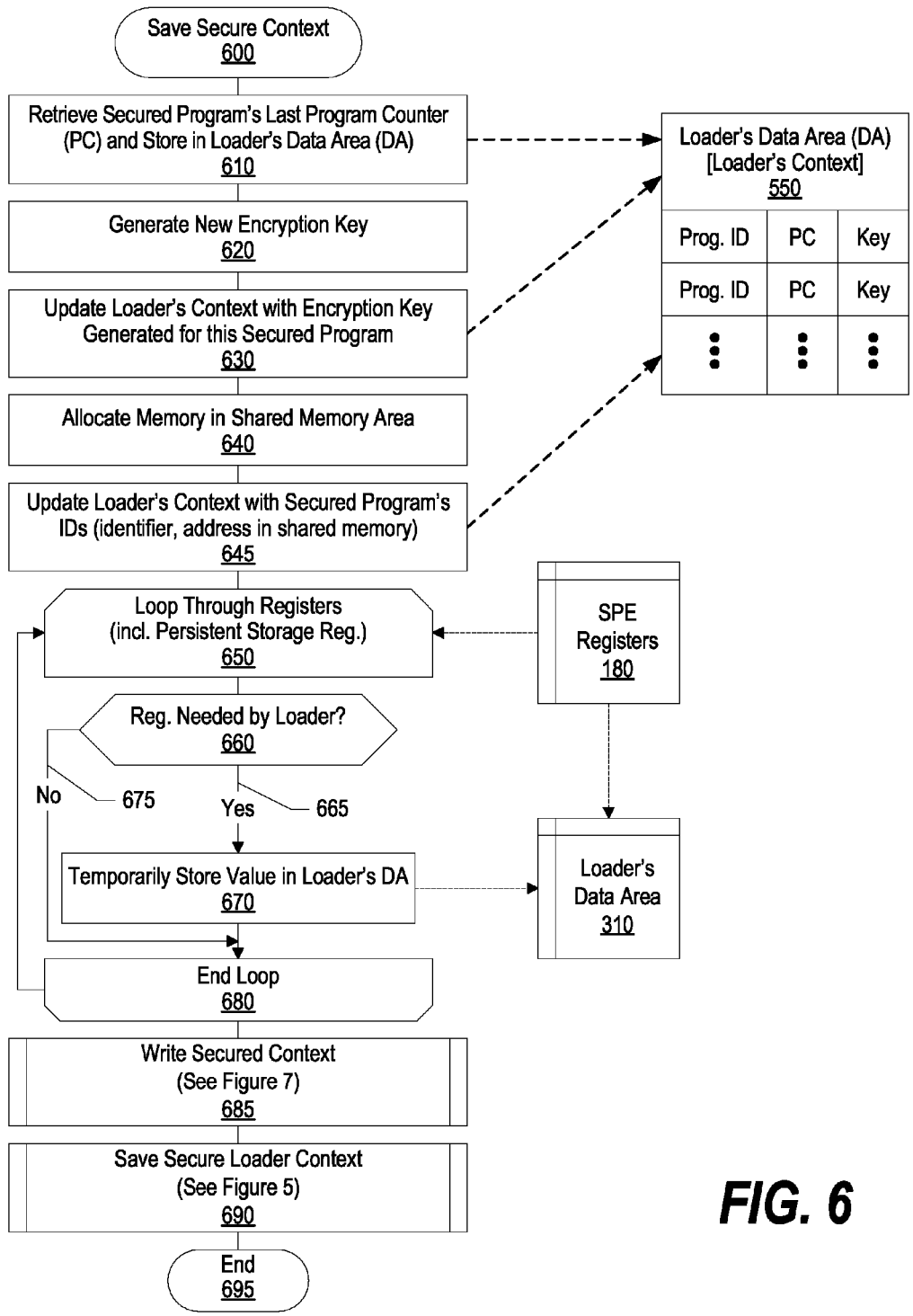
FIG. 6 is a flowchart showing the steps taken to securely save a program's context when the secure loader manages multiple secured programs.

FIG. 6 is a flowchart showing the steps taken to securely save a program's context when the secure loader manages multiple secured programs. In addition to steps shown in FIG. 6 for saving the secured program's context, a signature is generated and saved along with the program's context (see FIG. 13 and corresponding text for processing details). Processing commences at 600 after the secured program has been interrupted and has branched to the secure loader. At step 610, the secure loader retrieves the memory address where the secured program was interrupted and updates the secure loader's context (550) with the address (PC). At step 620, the secure loader generates a new encryption key. This encryption key is not stored in the persistent storage register, so a nonce is not used regardless of the size of the persistent storage register. At step 630, the secure loader's context (550) is updated to include the generated encryption key. At step 640, the secure loader allocates memory in the shared memory area for storing the encrypted context of the secured program. At step 645, the secure loader's context (550) is updated to include the secured program's identifier (a unique identifier of the secured program and the starting address of the memory that was allocated to store the encrypted context in shared memory).

A loop commences at 650 to loop through the various SPE registers (180). A determination is made as to whether each register is needed by the secure loader (decision 660). If a register is needed by the secure loader, decision 660 branches to "yes" branch 665 whereupon, at step 670, the register contents are stored in the secure loader's data area 310. If the register is not needed by the secure loader, then decision 660 branches to "no" branch 675 bypassing step 670. The loop ends at 680.

After registers needed by the secure loader have been freed, the secure loader encrypts and writes the secured program's context to the shared memory area (predefined process 685, see FIG. 7 and corresponding text for processing details). After the secured program's context has been saved, the secure loader's context (550) is saved (predefined process 690, see FIG. 5 and corresponding text for processing details). Processing then ends at 695.

FIG. 7 is a flowchart showing the steps taken to securely write context from an isolated specialized purpose processor (SPE) to a shared memory. In addition to steps shown in FIG. 7 for securely writing context data, a signature is generated and written to the shared memory along with the data (see FIG. 13 and corresponding text for processing details). Processing commences at 700 whereupon a loop is started at 710 to loop through the open space. As the open space is in unprotected storage, the data in open space 165 is not encrypted before writing to shared memory 130 (unencrypted data area 138). Within the loop, at step 720, each line in the open space is written, using a DMA command, to unencrypted data area 138 in shared memory 130. The loop ends at 725.

Another loop commences at 730 to loop through the protected storage lines where the secured program and its data (175) is currently stored. This data is in protected storage, so they are encrypted before being written to shared memory. In one embodiments the encryption key used to encrypt data written to shared memory is a static key encoded in the secure loader, while in another embodiment, the encryption key is dynamically generated each time a secured program's context is written to shared memory 130. Within the loop, at step 740, each line is encrypted and written to a preset location within open space 165. At step 750, the encrypted line is written, using a DMA command, from the preset location to encrypted context memory area 135 in shared memory 130. The second loop then ends at 760.

A third loop commences at 770 to loop through the SPE registers. Within this loop, at step 775, the value set by the secured program is retrieved. If the register is being used by the secure loader, then the secure loader previously stored the register value in the secure loader's data area and the register value is retrieved from the secure loader data area (310). Otherwise, the register value is retrieved from the SPE register (180). At step 780, each register value is encrypted and written to the preset location in open space 165. The register values can be encrypted using the same encryption key used to encrypt the secured program code and data in the second loop. At step 785, the encrypted line is written, using a DMA command, from the preset location to encrypted context memory area 135 in shared memory 130. The third loop then ends at 790, and processing returns to the calling routine at 795.

Figure 8:
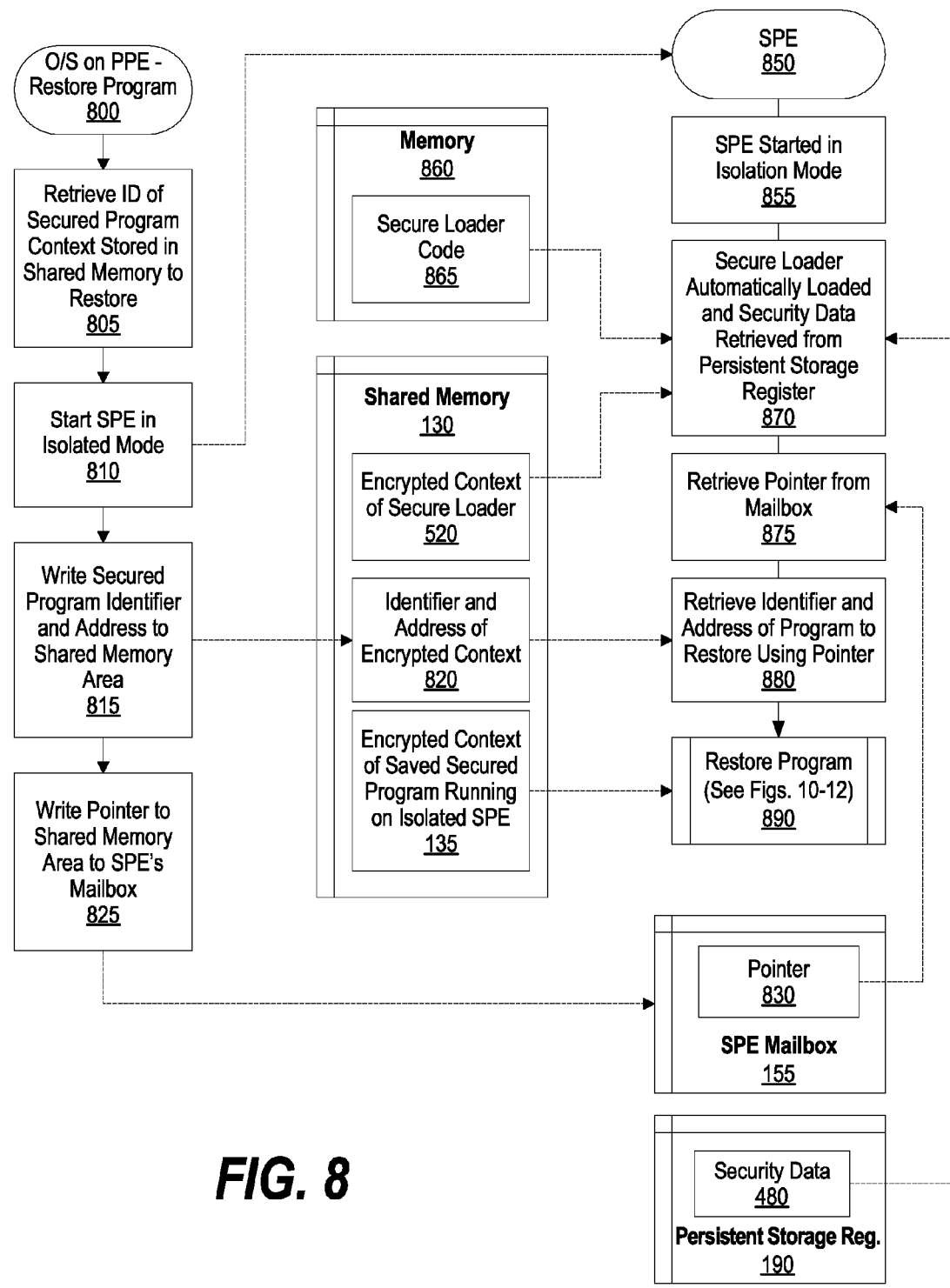
FIG. 8 is a flowchart showing the operating system requesting that a program be restored on a special purpose processor core.

FIG. 8 is a flowchart showing the operating system requesting that a program be restored on a special purpose processor core. In addition to the restoration steps shown in FIG. 8, a signature result is generated based on the data being restored and this result is compared to a previously stored signature result (see FIG. 14 and corresponding text for processing details). If the signatures match, then the restored context is executed, otherwise the SPE exits with an error without executing the restored context. The operating system processing shown starts at 800 whereupon, at step 805, the operating system retrieves the identifier of the secured program that should be restored on the SPE. At step 810, the SPE is started in isolation mode. At step 815, the secured program identifier and address are written by the operating system to an area in shared memory and, at step 820, the address of the shared memory where the secured program identifier and address are stored (pointer 830) is written to the SPE's mailbox (155).

SPE processing commences at 850 whereupon, at step 855, the SPE is stared in isolation mode. At step 870, the secure loader is automatically loaded into the SPE from memory area 860 using static secure loader code 865 and persistent security data 480 is retrieved from persistent storage register 190. In one embodiment, where the secure loader can manage the contexts of multiple secured programs, the secure loader's context is restored from encrypted secure loader context 520 (see FIG. 9 and corresponding text for processing details regarding restoring the secure loader's context). In this embodiment, the persistent security data is used to decrypt the secure loader's context. In another embodiment, the persistent security data is used to decrypt the secured program. At step 875, the secure loader polls the SPE mailbox and receives the request to restore a secured program. At step 880, the secure loader uses pointer 830 stored in SPE mailbox 155 to address the shared memory (820) where the operating system stored the identifier of the secured program and the address where the secured program's encrypted context is stored in shared memory. The secured program is then restored from the shared memory (predefined process 890, see FIGS. 10-12 and corresponding text for processing details).

Figure 9:
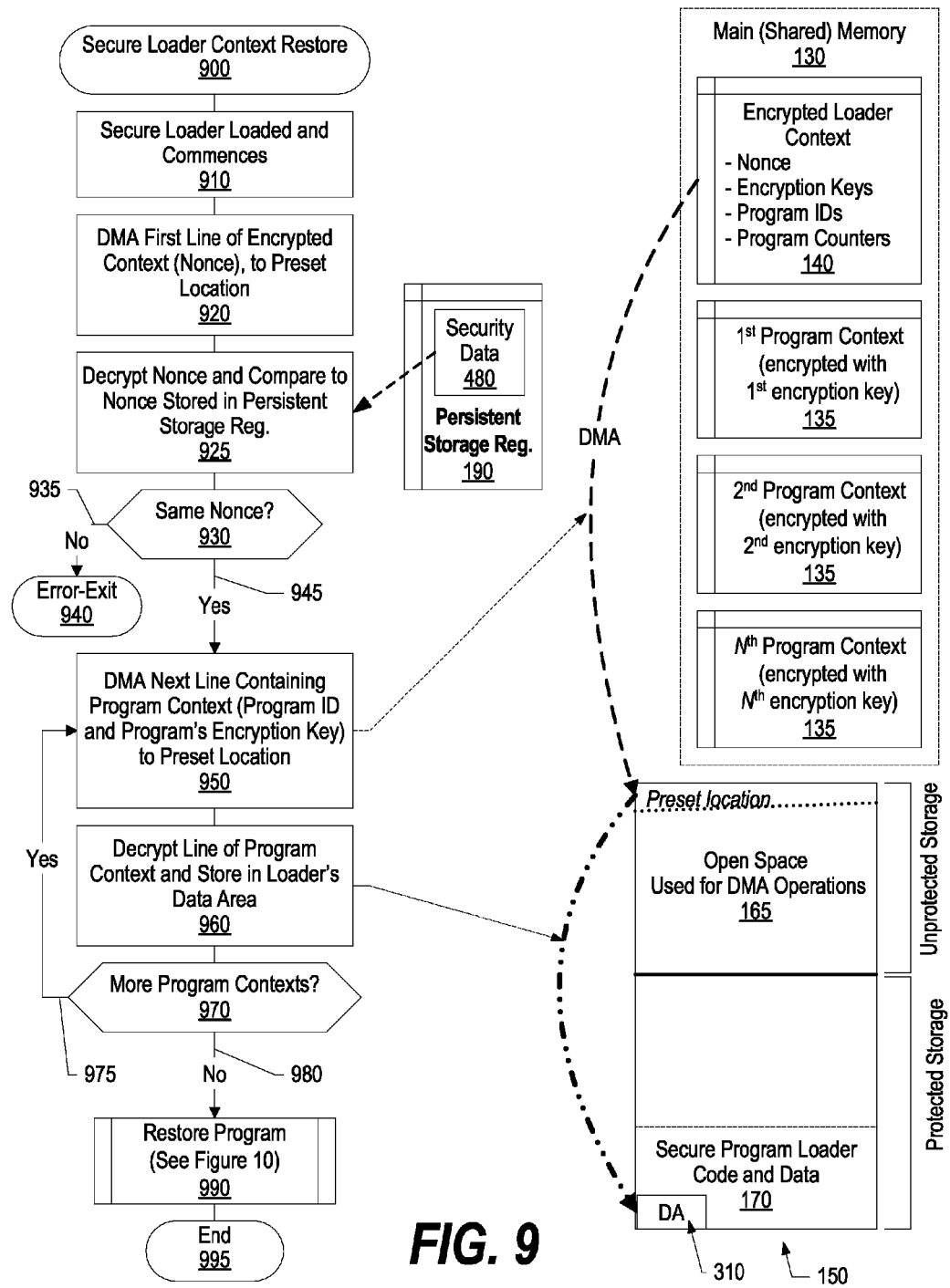
FIG. 9 is a flowchart showing the steps taken to securely restore the secure loader's context from a shared memory.

FIG. 9 is a flowchart showing the steps taken to securely restore the secure loader's context from a shared memory. In addition to the restoration steps shown in FIG. 9, a signature result is generated based on the data being restored and this result is compared to a previously stored signature result (see FIG. 14 and corresponding text for processing details). If the signatures match, then the restored context is executed, otherwise the SPE exits with an error without executing the restored context. Processing commences at 900 whereupon, at step 910, the secure loader is loaded in the SPE and initiates processing. In one embodiment, the secure loader is loaded from a static copy of the secure loader that is stored in a read-only memory. In one embodiment, the secure loader's context is encrypted with a static encryption key that is encoded in the secure loader's code. In this embodiment, a nonce was included encrypted and written to the secure loader's encrypted context when the secure loader was saved. The secure loader reads the first line of the encrypted context (containing the nonce) from the shared memory using a DMA command and stores the encrypted line in a preset location in open space 165. At step 925, the static encryption key encoded in the secure loader is used to decrypt the line stored in the preset location revealing the nonce. At step 925, the decrypted nonce is compared with the nonce (persistent security data 480) that was stored in persistent storage register 190. A determination is made as to whether the nonces are the same (decision 930). If the nonces are not the same (indicating that someone attempted to alter the secure loader's context), then decision 930 branches to "no" branch 935 and processing ends with an error at 940. On the other hand, if the nonces are the same, then decision 930 branches to "yes" branch 945 and processing continues.

In another embodiment, the persistent storage register is large enough to store at least 128 bits. In this embodiment, the secure loader's context was encrypted using a randomly generated key (persistent security data 480). This key is stored in the persistent storage register and the secure loader's context are then decrypted by retrieving the persistent security data (the randomly generated encryption key) from the persistent storage register. In this embodiment, a nonce is not used and therefore steps 920 through 945 are not performed.

Returning to FIG. 9, at step 950 the first line containing secure loader's context is read from encrypted loader context 140 stored in shared memory 130 to a preset location of open space 165 within the SPE using a DMA command. Each line of secure loader context includes data regarding one of the secured programs being managed by the secure loader. This data includes the encryption key used to encrypt the secured program's context, program identifiers (name, handle, etc. and addresses) corresponding to the secured program, and a program counter with the address where the secured program was interrupted. At step 960, the encrypted line that was written to the preset location of open space 165 is decrypted using the encryption key (either a static key or a randomly generated key). A determination is made as to whether there are more secured program contexts being managed by the secure loader (decision 970). If there are more secured program contexts being managed, decision 970 branches to "yes" branch 975 which loops back to read the next encrypted line from encrypted loader context 140 and decrypt the context. This looping continues until there are no more secured program contexts to read, at which point decision 970 branches to "no" branch 980, whereupon, at predefined process 990, one of the secured programs (the one requested by the operating system) is restored (see FIG. 10 and corresponding text for processing details). Processing thereafter ends at 995.

Figure 10:
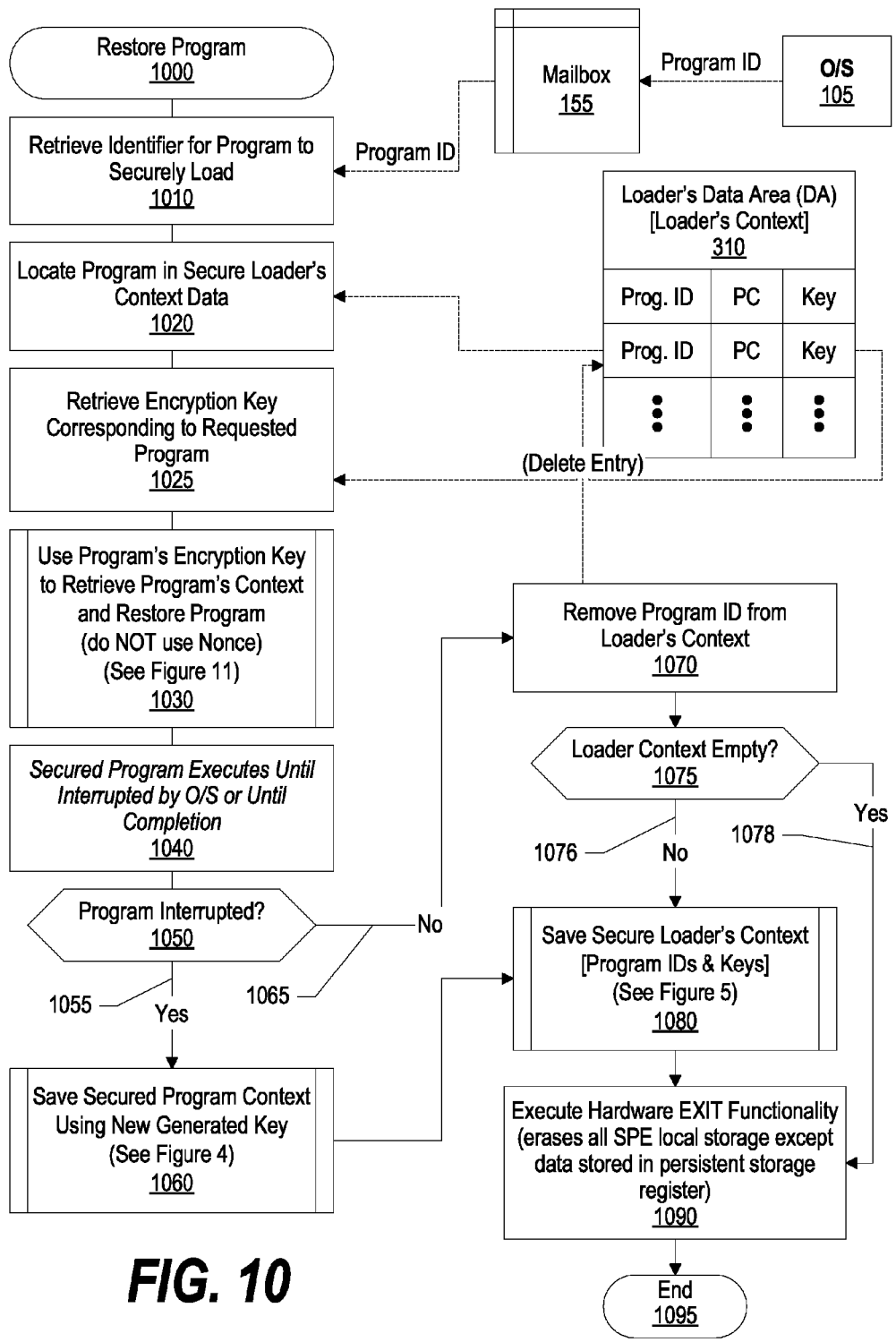
FIG. 10 is a flowchart showing the steps taken to restore a program's context using a secure loader that is managing multiple secured programs.

FIG. 10 is a flowchart showing the steps taken to restore a program's context using a secure loader that is managing multiple secured programs. In addition to the restoration steps shown in FIG. 10, a signature result is generated based on the data being restored and this result is compared to a previously stored signature result (see FIG. 14 and corresponding text for processing details). If the signatures match, then the restored context is executed, otherwise the SPE exits with an error without executing the restored context. Processing commences at 1000 whereupon, at step 1010 the secure loader retrieves the identifier of the program that operating system 105 is requesting to restore from SPE mailbox 155. In one embodiment, a pointer has been written by operating system 105 to mailbox 155 and the secure loader retrieves an identifier of the secured program from a shared memory location referenced by the pointer. At step 1020, the secure loader locates data corresponding to the secured program in the secure loader's context (310). The loader's context includes the secured program's identifier (unique identifier such as a name or handle as well as the address where the secured program's encrypted context is stored in shared memory), the encryption key that was used to encrypt the secured program's encrypted context, and the program counter where the secured program was interrupted.

At step 1025, the secure loader retrieves the encryption key that was used to encrypt the requested secured program's context when it was written to shared memory. The retrieved encryption key is used to retrieve the requested secured program's context from shared memory and restore the secured program on the SPE (predefined process 1030, see FIG. 11 and corresponding text for processing details). After the secured program has been restored, it executes on the SPE until it is either interrupted by the operating system or until completion (1040). A determination is made as to whether the secured program was interrupted or completed (decision 1050). If the program was interrupted, then decision 1050 branches to "yes" branch 1055 whereupon the secured program's context is saved using a new generated key (see FIG. 4 and corresponding text for processing details) and the secure loader's context (updated with new data corresponding to the secured program) is saved at predefined process 1080 (see FIG. 5 and corresponding text for processing details). If the secured program ran until completion, decision 1050 branches to "no" branch 1065 whereupon, at step 1070, data corresponding to the secured program is deleted from secure loader's context 310. A determination is then made as to whether the secure loader's context is now empty, indicating that the secure loader is no longer managing any secured programs on the SPE (decision 1075). If the secure loader's context is not empty, then decision 1075 branches to "no" branch 1076 whereupon the secure loader's context is saved at predefined process 1080 (see FIG. 5 and corresponding text for processing details). On the other hand, if the secure loader's context is now empty, then decision 1075 branches to "yes" branch 1078 bypassing predefined process 1080.

Before the secure loader completes, at step 1090, the secure loader issues a hardware EXIT instruction. The EXIT instruction erases all data stored in the SPE's local storage except for data stored in the persistent storage register. Secure loader processing then ends at 1095.

Figure 11:
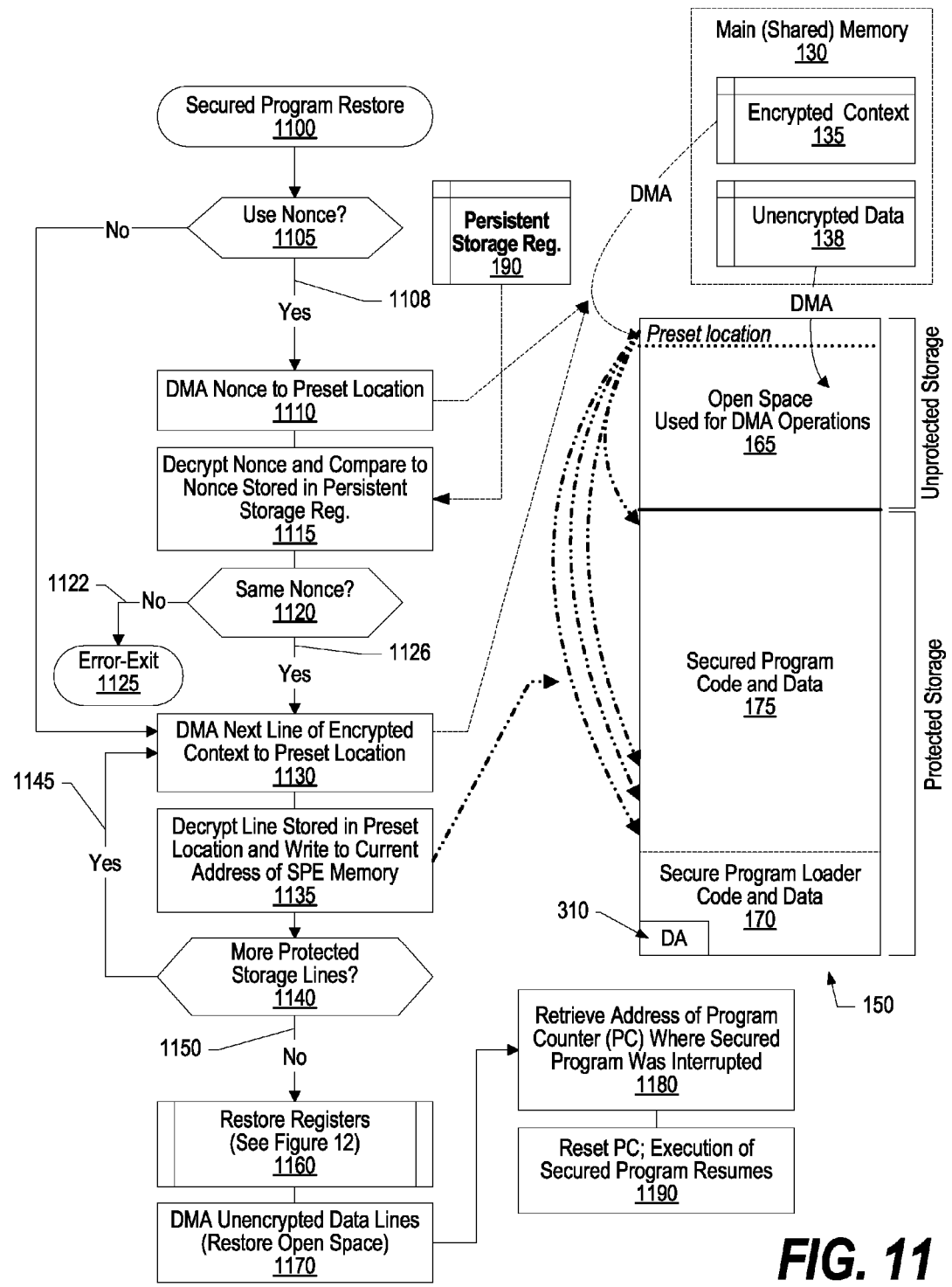
FIG. 11 is a flowchart showing details of the secure loader reading encrypted context data from a shared memory and restoring the data to the special purpose processor core running in an isolation mode.

FIG. 11 is a flowchart showing details of the secure loader reading encrypted context data from a shared memory and restoring the data to the special purpose processor core running in isolation mode. In addition to the reading performed in FIG. 11, a signature result is generated based on the encrypted data being read from shared memory and this result is compared to a previously stored signature result (see FIG. 14 and corresponding text for processing details). If the signatures match, then the restored context is executed, otherwise the SPE exits with an error without executing the restored context. Processing commences at 1100 whereupon a determination is made as to whether the image signature of encrypted context 135 matches the image signature that was taken at the time the encrypted context was created (decision 1101). In one embodiment, the signature is generated based on the image (i.e. all data to be stored including the nonce, if a nonce is being used), the signature is appended to the image, and then everything is encrypted (image, signature, etc.) and stored. In another embodiment, the image is encrypted first, and then the signature is generated based on the encrypted image and the signature is then appended to the image. The correct signature can only be generated by correct the key (which can be the same as the encryption key or a separate authentication key). If the image signatures do not match (indicating that the image has been altered or tampered), decision 1101 branches to "no" branch 1102 whereupon secure loader processing exits at 1103 with an error. On the other hand, if the image signatures match, then decision 1101 branches to "yes" branch 1104 and secure loader processing continues.

A determination is made as to whether a nonce is being used to secure the secured program's context (decision 1105). If a nonce is not being used, then decision 1105 branches to "no" branch 1128 bypassing steps 1110 through 1125. On the other hand, if a nonce is being used, then decision 1105 branches to "yes" branch 1108 whereupon, at step 1110, the line from encrypted context 135 that contains the nonce is written, using a DMA command, from encrypted context 135 to a preset location within open space 165. At step 1115, the nonce written to the preset location is decrypted using a static key encoded in the secure loader and the decrypted nonce is compared to the nonce that was stored in persistent storage register 190. A determination is made as to whether the decrypted nonce is the same as the nonce stored in the persistent storage register (decision 1120). If the nonces are not the same (indicating that someone tampered with the encrypted context or is attempting a reply attack), then decision 1120 branches to "no" branch 1122 whereupon secure loader processing exits at 1125 with an error. On the other hand, if the nonces are the same, then decision 1120 branches to "yes" branch 1126 and secure loader processing continues.

At step 1130, the first line of encrypted secured program context is read from shared memory 130 (encrypted context 135) using a DMA command and stored in a preset location in open space 165. The encrypted line written to preset location is decrypted at step 1135. In one embodiment (where a nonce is used), the lines are decrypted using a static key that is encoded in the secure loader. In another embodiment (where a nonce is not needed), the lines are decrypted using a randomly generated key that is either stored in persistent storage register 190 or retrieved from the secure loader's context (when the secure loader is capable of managing multiple secured programs). A determination is made as to whether there are more protected storage lines that need to be read and decrypted (decision 1140). Decision 1140 branches to "yes" branch 1145 which loops back to process the next line from encrypted context 135 until all lines of encrypted context 135 have been processed, at which point decision 1140 branches to "no" branch 1150.

Figure 12:
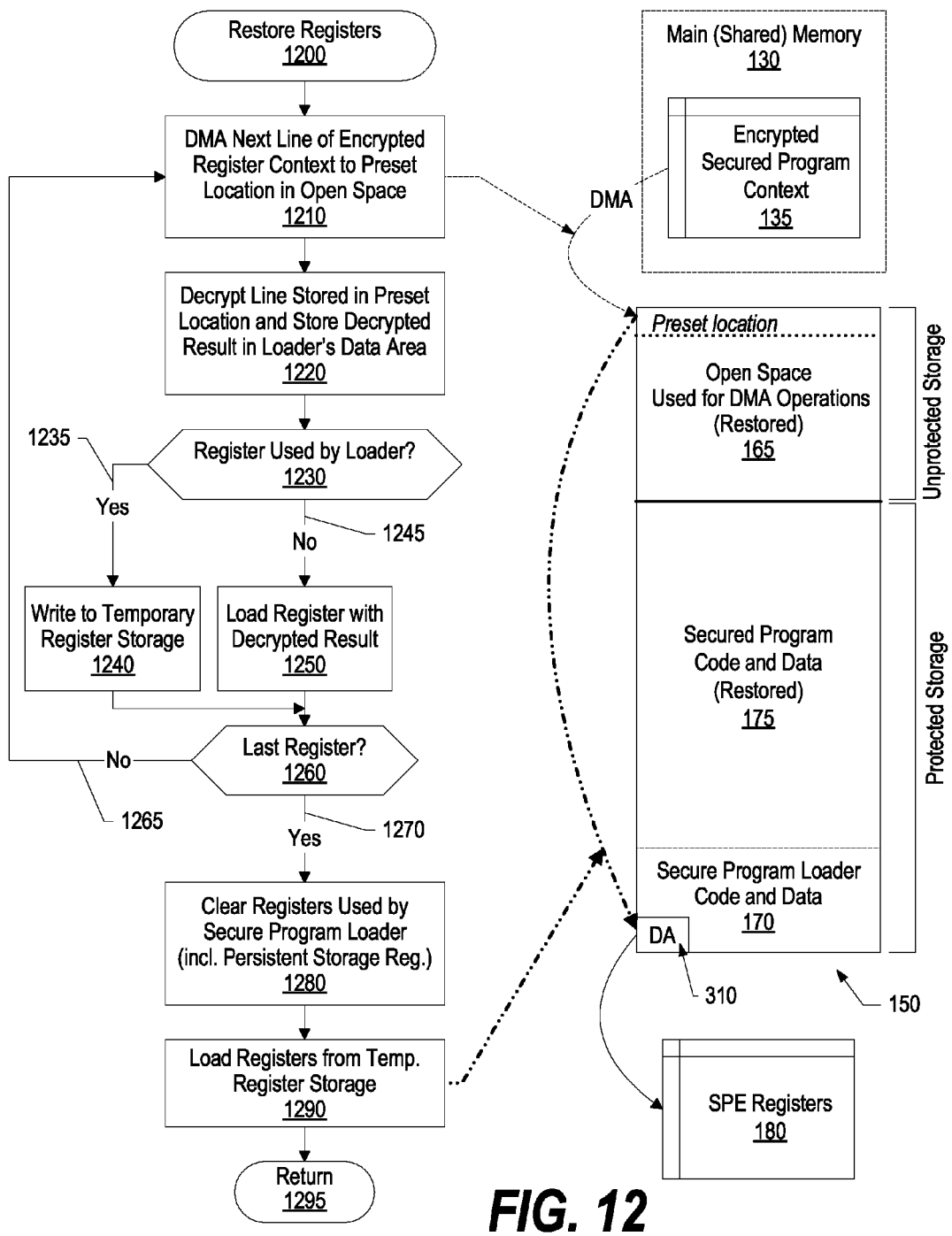
FIG. 12 is a flowchart showing the steps taken to restore register values corresponding to a program context that is being restored.

At predefined process 1160, the register values that had been set by the secured program before being interrupted are restored to the SPE registers (see FIG. 12 and corresponding text for processing details). At step 1170, unencrypted data lines are read from unencrypted data 138 stored in shared memory 130 and restored to open space 165. The restored open space now looks like the open space did before the secured program was interrupted. As previously mentioned, the open space is used for DMA communications between the SPE running in isolation mode and the shared memory. These DMA communication include data sent to/from the shared memory as well as return code values indicating the results of prior DMA operations. At step 1180, the address of the program counter (PC) where the secured program was interrupted is retrieved. If the secure loader is managing the context of multiple secured programs, then the PC is retrieved from the secure loader's context. If the secure loader is not managing the context of multiple secured programs and context for the secure loader is therefore not available, then the PC is retrieved either from one of the restored registers or from a line of encrypted context written to the secured program's encrypted context (135). At step 1190, the secured program's program counter is reset and the secured program resumes executing instructions until it either completes or it is interrupted by the operating system.

FIG. 12 is a flowchart showing the steps taken to restore register values corresponding to a program context that is being restored. In addition to the register restoration steps shown in FIG. 12, a signature result is generated based on the data being restored and this result is compared to a previously stored signature result (see FIG. 14 and corresponding text for processing details). If the signatures match, then the restored context is executed, otherwise the SPE exits with an error without executing the restored context. Processing commences at 1200 whereupon, at step 1210, the first line of encrypted register context is read from shared memory 130 (encrypted program context 135) using a DMA command and written to a preset location in the SPE's open space (165). At step 1220, the secure loader decrypts the line stored in the preset location and stores the result in the secure loader's data area (310). In one embodiment, a static key encoded in the secure loader is used to decrypt the lines written to the preset location. In another embodiment, a key that was randomly generated and used to encrypt the data is retrieved from either the persistent storage register or from the secure loader's context and this key is used to decrypt the data that was written to the preset location. A determination is made as to whether the register is used by the secure loader (decision 1230). If the register is used by the secure loader, then decision 1230 branches to "yes" branch 1235 whereupon, at step 1240, the value is written to a temporary register storage location within the secure loader's data area 310. On the other hand, if the register is not used by the secure loader, then decision 1230 branches to "no" branch 1245 whereupon, at step 1250, the register (SPE Register 180) is loaded with the decrypted result from the preset location.

A determination is made as to whether this is the last register to process (decision 1260). If it is not the last register, then decision 1260 branches to "no" branch 1265 which loops back to DMA and process the next encrypted line of register context. This looping continues until the last register has been processed, at which time, decision 1260 branches to "yes" branch 1270.

At step 1280, the registers that were being used by the secure loader are cleared. In one embodiment, this includes clearing the persistent storage register which is then available for use by the secured program. At step 1290, any register values that were written to temporary register storage in the secure loader's data area are written to their respective registers (SPE Registers 180). Processing thereafter ends at 1295.

Figure 13:
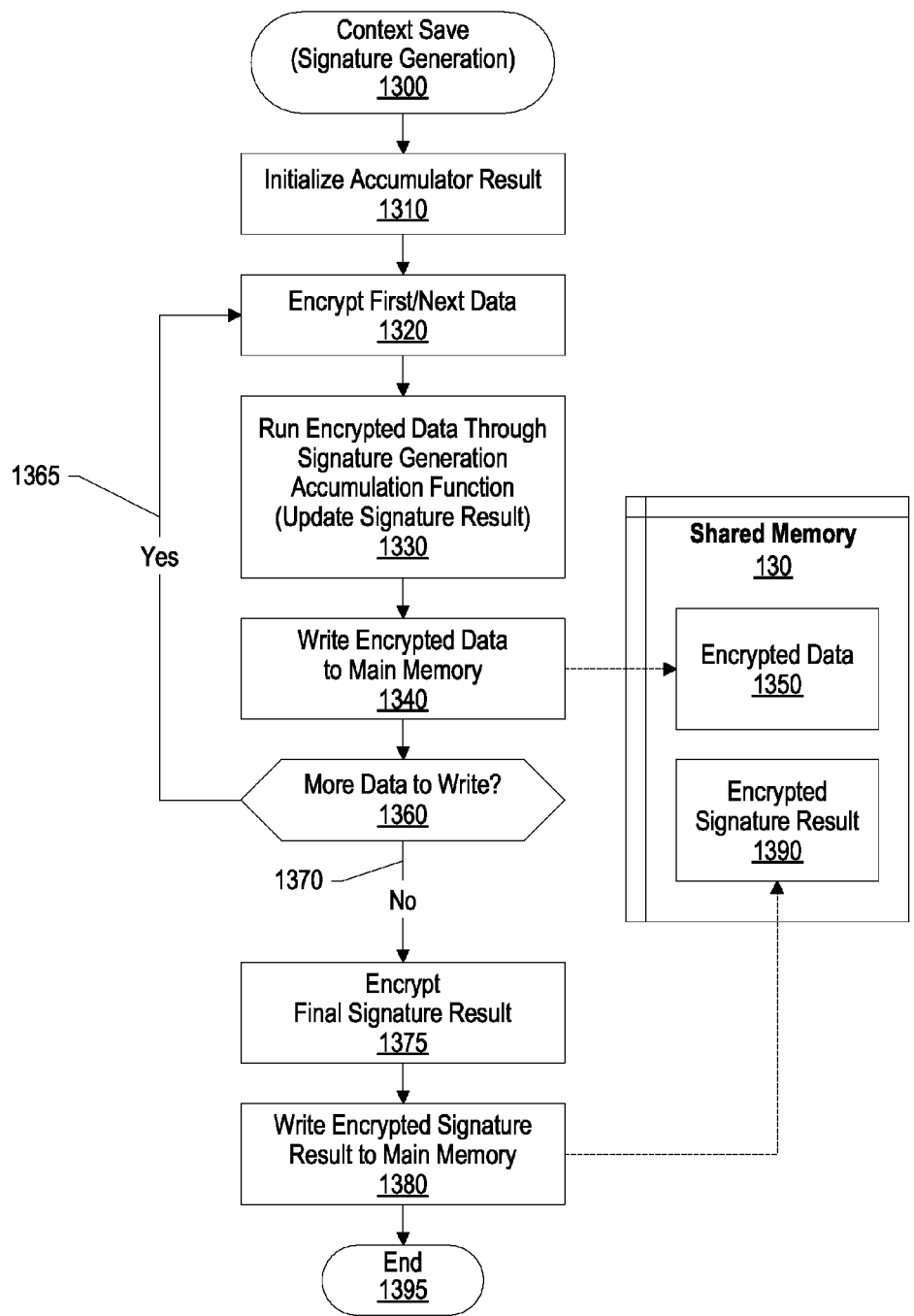
FIG. 13 is a flowchart showing the steps taken to generate a signature while saving the context of either a secured program or the secure loader.

FIG. 13 is a flowchart showing the steps taken to generate a signature while saving the context of either a secured program or the secure loader. As previously mentioned in reference to other Figures, the steps shown in FIG. 13 are performed in conjunction with other processes that save various context data (e.g., secured program contexts, secure loader contexts, register contexts, etc.). Processing commences at 1300 whereupon, at step 1310, the signature result is initialized. At step 1320, the first data being saved is encrypted. This data may be a line of data from the SPE memory, a register, etc., depending on what context is being saved. At step 1330, the encrypted data is inputted to a signature generation accumulation function which updates the signature result. At step 1340, the encrypted data is written to shared memory 130 as encrypted data 1350 (e.g., encrypted contexts of secured programs 135, encrypted context of secure loader 140, etc.). A determination is made as to whether there is more data to be encrypted and written to shared memory 130 (decision 1360). If there is more data to be written, decision 1360 branches to "yes" branch 1365 which loops back to encrypt the next data, run the next encrypted data through the signature accumulation function (updating the signature result), and write the next encrypted data to shared memory. This looping continues until there is no more data to be written, at which point decision 1360 branches to "no" branch 1370.

After all data has been encrypted and written to shared memory 130, at step 1375, the final signature result is encrypted. At step 1380, the encrypted final signature result is written to shared memory as encrypted final signature result 1390. Signature generation processing thereafter ends at 1395.

Figure 14:
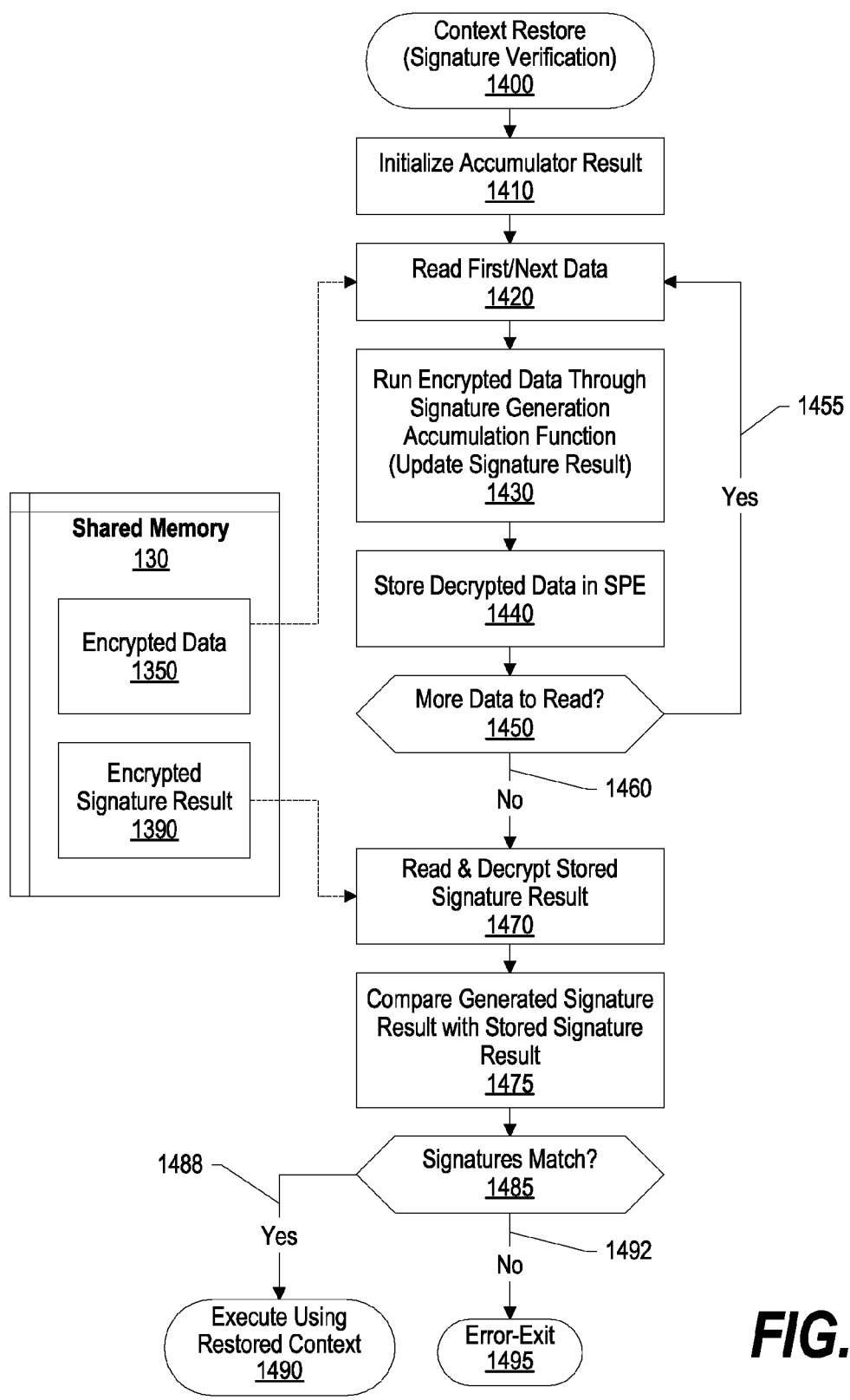
FIG. 14 is a flowchart showing the steps taken to generate a signature while restoring the context of either a secured program or the secure loader and comparing the generated signature with a signature that was stored when the context was saved.

FIG. 14 is a flowchart showing the steps taken to generate a signature while restoring the context of either a secured program or the secure loader and comparing the generated signature with a signature that was stored when the context was saved. As previously mentioned in reference to other Figures, the steps shown in FIG. 14 are performed in conjunction with other processes that restore various context data (e.g., secured program contexts, secure loader contexts, register contexts, etc.). Signature verification processing commences at 1400 whereupon, at step 1410, the signature result is initialized. At step 1420, the first encrypted data is read from encrypted data store 1350 that is stored in shared memory 130. This data may be a line of data from the SPE memory, a register, etc., depending on what context is being restored. At step 1430, the encrypted data that was read in step 1420 is inputted to the signature generation accumulation function which updates the signature result. The accumulation function used in step 1430 is the same accumulation function that was used in step 1330 shown in FIG. 13. Returning to FIG. 14, at step 1440, the decrypted data is stored in the SPE (e.g., in the SPE memory, SPE register location(s), etc., depending on the type of data being restored). A determination is made as to whether there is more data to read from encrypted data 1350 (decision 1450). If there is more data to process, decision 1450 branches to "yes" branch 1455 which loops back to read the next data, run the next data through the accumulation function (further updating the signature result), and storing the data in the SPE. This looping continues until all encrypted data has been read and processed from encrypted data 1350, at which point decision 1460 branches to "no" branch.

After all encrypted data has been read and processed, at step 1470, stored signature result 1390 is read from shared memory 130 and the stored signature result is decrypted. At step 1475, the signature result generated in step 1430 is compared with the decrypted stored signature result of step 1470. A determination is made as to whether the signatures match (decision 1485). If the signatures match, decision 1485 branches to "yes" branch 1488 whereupon the restored context is executed on the SPE. On the other hand, if the signatures do not match (indicating possible tampering of encrypted context data 1350), decision 1485 branches to "no" branch 1492 whereupon restoration processing ends with an error and without executing the restored context. In one embodiment, SPE EXIT functionality is performed when the SPE exits with an error (thus erasing local data except for data stored in the persistent storage register).

FIG. 15 is a block diagram illustrating a processing element (heterogeneous processor) having a main processor (general purpose processor core) and a plurality of secondary processors (special purpose processor cores) that each share a system memory. FIG. 15 depicts a heterogeneous processor that can be used to implement the present invention. Primary Processor Element (PPE) 1505 includes processing unit (PU) 1510, which, in one embodiment, is a general purpose processor core that acts as the main processor and runs an operating system. Processing unit 1510 may be, for example, a Power PC core executing a Linux operating system. PPE 1505 also includes a plurality of synergistic processing elements (SPEs) such as SPEs 1545, 1565, and 1585. The SPEs include synergistic processing units (SPUs) are special purpose processor cores that act as secondary processing units to PU 1510, a memory storage unit, and local storage. For example, SPE 1545 includes SPU 1560, MMU 1555, and local storage 1559; SPE 1565 includes SPU 1570, MMU 1575, and local storage 1579; and SPE 1585 includes SPU 1590, MMU 1595, and local storage 1599.

All SPEs may use the same ISA, or may each implement an application specific ISA. Each SPE may be configured to perform a different task, and accordingly, in one embodiment, each SPE may be accessed using different instruction sets. If PPE 1505 is being used in a wireless communications system, for example, each SPE may be responsible for separate processing tasks, such as modulation, chip rate processing, encoding, network interfacing, etc. In another embodiment, the SPEs may have identical instruction sets and may be used in parallel with each other to perform operations benefiting from parallel processing.

PPE 1505 may also include level 2 cache, such as L2 cache 1515, for the use of PU 1510. In addition, PPE 1505 includes system memory 1520, which is shared between PU 1510 and the SPUs. System memory 1520 may store, for example, an image of the running operating system (which may include the kernel), device drivers, I/O configuration, etc., executing applications, as well as other data. System memory 1520 includes the local storage units of one or more of the SPEs, which are mapped to a region of system memory 1520. For example, local storage 1559 may be mapped to mapped region 1535, local storage 1579 may be mapped to mapped region 1540, and local storage 1599 may be mapped to mapped region 1542. PU 1510 and the SPEs communicate with each other and system memory 1520 through bus 1517 that is configured to pass data between these devices.

The MMUs are responsible for transferring data between an SPU's local store and the system memory. In one embodiment, an MMU includes a direct memory access (DMA) controller configured to perform this function. PU 1510 may program the MMUs to control which memory regions are available to each of the MMUs. By changing the mapping available to each of the MMUs, the PU may control which SPU has access to which region of system memory 1520. In this manner, the PU may, for example, designate regions of the system memory as private for the exclusive use of a particular SPU. In one embodiment, the SPUs' local stores may be accessed by PU 1510 as well as by the other SPUs using the memory map. In one embodiment, PU 1510 manages the memory map for the common system memory 1520 for all the SPUs. The memory map table may include PU 1510's L2 Cache 1515, system memory 1520, as well as the SPUs' shared local stores.

In one embodiment, the SPUs process data under the control of PU 1510. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 1510 and by the other SPUs. An SPU may reserve part of its local store in order for the SPU to have fast, guaranteed memory access when performing tasks that require such fast access. The SPU may also run in isolation mode and reserve its local store as private when processing sensitive data, as is the case, for example, when the SPU is performing encryption/decryption. When in isolation mode, a portion of the SPU's memory is reserved as "open space" that is not private. The open space is able to be used for DMA operations to read and write data between the SPU and shared memory.

While the heterogeneous computer system described in FIG. 15 is capable of executing the processes described herein, this computer system is simply one example of a heterogeneous computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method for securely saving a program's context, the method comprising:
   receiving an interrupt from a general purpose processor core at a special purpose processor core that is running in an isolation mode and executing a secured program, wherein:
      a heterogeneous processor includes a plurality of heterogeneous processor cores, the plurality of heterogeneous processor cores including the general purpose processor core and the isolated special purpose processor core;
      the isolated special purpose processor core includes a local memory that is inaccessible from other processor cores included in the heterogeneous processor while the special purpose processor core is running in the isolation mode; and
      each of the heterogeneous processor's cores can access a shared memory; and
   in response to receiving the interrupt, securely saving, at the special purpose processor core, the secured program's context to the shared memory, wherein the context comprises code lines and data values, the saving including:
      generating a random persistent security data;
      reading the code lines from the isolated special purpose processor core's local memory;
      reading the data values from the isolated special purpose processor core's local memory;
      encrypting the code lines and the data values using the generated persistent security data;
      storing the encrypted code lines and the encrypted data values in an unprotected open memory space included in the isolated special purpose processor core; and
      performing a direct memory access (DMA) transfer that reads the encrypted code lines stored in the unprotected open memory space and writes the encrypted code lines to the shared memory.

2. The method of claim 1 further comprising:
   saving the generated persistent security data in a persistent storage register, wherein the persistent security data is a nonce, wherein one of the data values that is encrypted is the nonce, and wherein the encrypting is performed using a static encryption key.

3. The method of claim 1 wherein the persistent security data is an encryption key used in performing the encrypting, the method further including saving the persistent security data in a persistent storage register.

4. The method of claim 1 wherein at least one of the data values is a register value corresponding to a register included in the isolated special processing unit.

5. The method of claim 1 further comprising:
   retrieving a program counter corresponding to a location within the secured program where the secured program was interrupted;
   encrypting the program counter; and
   storing the encrypted program counter in the shared memory.

6. The method of claim 1 further comprising:
   after the storing:
   clearing the isolated special purpose processor core's local memory, the clearing leaving the persistent storage register intact;
   returning the special purpose processor core to a non-isolation mode; and
   loading a second program in the special processing unit running in non-isolation mode, wherein the persistent storage register is only accessible when the special purpose processor core is running in isolation mode.

7. The method of claim 1 further comprising:
   inputting the encrypted code lines and the encrypted data values to a signature generation function, the signature generation function resulting in an signature result; and
   storing the signature result in the shared memory.

8. An information handling system comprising:
   a heterogeneous processor having one or more special purpose processor cores and one or more general purpose processor cores, wherein one of the special purpose processor cores is running in an isolation mode;
   a shared memory accessible by the special purpose processor cores and the general purpose processor cores;
   a local memory corresponding to each of the plurality of heterogeneous processors, wherein the local memory corresponding to the isolated special purpose processor core is inaccessible by the other heterogeneous processors;

a set of instructions stored in one of the local memories, wherein one or more of the heterogeneous processors executes the set of instructions in order to perform actions of:

receiving an interrupt from one of the general purpose processor cores at the isolated special purpose processor core, which is executing a secured program;

in response to receiving the interrupt, securely saving, at the isolated special purpose processor core, the secured program's context to the shared memory, wherein the context comprises code lines and data values, the saving including:

generating a random persistent security data;

reading the code lines from the isolated special purpose processor core's local memory;

reading the data values from the isolated special purpose processor core's local memory;

encrypting the code lines and the data values using the generated persistent security data;

storing the encrypted code lines and the encrypted data values in an unprotected open memory space included in the isolated special purpose processor core; and performing a direct memory access (DMA) transfer that reads the encrypted code lines stored in the unprotected open memory space and writes the encrypted code lines to the shared memory.

9. The information handling system of claim 8 further comprising:

one or more persistent storage registers, wherein each persistent storage register corresponds to one of the special purpose processor cores and wherein data stored in the persistent storage register is only accessible when the special purpose processor core is running in isolation mode, wherein the set of instructions further performs actions of:

saving the generated persistent security data in the persistent storage register, wherein the persistent security data is a nonce, wherein one of the data values that is encrypted is the nonce, and wherein the encrypting is performed using a static encryption key.

10. The information handling system of claim 8 further comprising:

one or more persistent storage registers, wherein each persistent storage register corresponds to one of the special purpose processor cores and wherein data stored in the persistent storage register is only accessible when the special purpose processor core is running in isolation mode, wherein the set of instructions further performs actions of:

randomly generating an encryption key, wherein the persistent security data is the randomly generated encryption key;

using the randomly generated encryption key to perform the encrypting; and saving the persistent security data in the persistent storage register.

11. The information handling system of claim 8 wherein at least one of the data values is a register value corresponding to a register included in the isolated special processing unit.

12. The information handling system of claim 8 further comprising:

a program counter corresponding to a location within the secured program where the secured program was interrupted, wherein the set of instructions further performs actions of:

retrieving the program counter;

encrypting the program counter; and storing the encrypted program counter in the shared memory.

13. The information handling system of claim 8 further comprising the set of instructions further performing actions of:

after the storing:

clearing the isolated special purpose processor core's local memory, the clearing leaving the persistent storage register intact;

returning the isolated special purpose processor core to a non-isolation mode; and loading a second program in the special processing unit running in non-isolation mode, wherein the persistent storage register is only accessible when the special purpose processor core is running in isolation mode.

14. The information handling system of claim 8 further comprising the set of instructions further performing actions of:

inputting the encrypted code lines and the encrypted data values to a signature generation function, the signature generation function resulting in an signature result; and storing the signature result in the shared memory.

15. A non-transitory computer program product stored in a computer readable medium, comprising functional descriptive material that, when executed by a information handling system, causes the information handling system to perform actions that include:

securely saving a program's context to a shared memory in a heterogeneous processor having one or more special purpose processor cores and one or more general purpose processor cores, wherein each of the heterogeneous processor cores can access the shared memory, the secure saving including functional descriptive material that, when executed by the information handling system, causes the information handling system to perform additional actions that include:

receiving an interrupt from one of the general purpose processor cores at one of the special purpose processor cores that is running in an isolation mode and executing a secured program, wherein the isolated special purpose processor core includes a local memory that is inaccessible from the other heterogeneous processor cores;

in response to receiving the interrupt, securely saving, at the one of the special purpose processor cores, the secured program's context to the shared memory, wherein the context comprises code lines and data values, the saving including:

generating a random persistent security data;

reading the code lines from the isolated special purpose processor core's local memory;

reading the data values from the isolated special purpose processor core's local memory;

encrypting the code lines and the data values using the generated persistent security data;

storing the encrypted code lines and the encrypted data values in an unprotected open memory space included in the isolated special purpose processor core; and performing a direct memory access (DMA) transfer that reads the encrypted code lines stored in the unprotected open memory space and writes the encrypted code lines to the shared memory.

16. The computer program product of claim 15 further comprising functional descriptive material that, when executed by the information handling system, causes the information handling system to perform additional actions that include:
saving the generated persistent security data in a persistent storage register, wherein the persistent security data is a nonce, wherein one of the data values that is encrypted is the nonce, and wherein the encrypting is performed using a static encryption key.

17. The computer program product of claim 15 wherein the persistent security data is an encryption key used in performing the encrypting, the computer program product further including functional descriptive material that, when executed by the information handling system, causes the information handling system to save the persistent security data in a persistent storage register.

18. The computer program product of claim 15 further comprising functional descriptive material that, when executed by the information handling system, causes the information handling system to perform additional actions that include:
retrieving a program counter corresponding to a location within the secured program where the secured program was interrupted;
encrypting the program counter; and
storing the encrypted program counter in the shared memory.

19. The computer program product of claim 15 further comprising functional descriptive material that, when executed by the information handling system, causes the information handling system to perform additional actions that include:
after the storing:
clearing the isolated special purpose processor core's local memory, the clearing leaving the persistent storage register intact;
returning the special purpose processor core to a non-isolation mode; and
loading a second program in the special processing unit running in non-isolation mode, wherein the persistent storage register is only accessible when the special purpose processor core is running in isolation mode.

20. The computer program product of claim 15 further comprising functional descriptive material that, when executed by the information handling system, causes the information handling system to perform additional actions that include:
inputting the encrypted code lines and the encrypted data values to a signature generation function, the signature generation function resulting in an signature result; and
storing the signature result in the shared memory.

* * * * *